US010750168B2

(12) United States Patent
Henry et al.

(10) Patent No.: US 10,750,168 B2
(45) Date of Patent: Aug. 18, 2020

(54) IMAGE ENCODING AND DECODING METHOD, ENCODING AND DECODING DEVICE AND CORRESPONDING COMPUTER PROGRAMS

(71) Applicant: Orange, Paris (FR)

(72) Inventors: Felix Henry, Saint Gregoire (FR); Bihong Huang, Rennes (FR)

(73) Assignee: ORANGE, Paris (FR)

( * ) Notice: Subject to any disclaimer, the term of this patent is extended or adjusted under 35 U.S.C. 154(b) by 215 days.

(21) Appl. No.: 15/551,799

(22) PCT Filed: Feb. 18, 2016

(86) PCT No.: PCT/FR2016/050374
§ 371 (c)(1),
(2) Date: Aug. 17, 2017

(87) PCT Pub. No.: WO2016/132075
PCT Pub. Date: Aug. 25, 2016

(65) Prior Publication Data
US 2018/0070078 A1 Mar. 8, 2018

(30) Foreign Application Priority Data

Feb. 19, 2015 (FR) ...................................... 15 51425

(51) Int. Cl.
*H04N 19/12* (2014.01)
*H04N 19/107* (2014.01)
(Continued)

(52) U.S. Cl.
CPC .......... *H04N 19/107* (2014.11); *H04N 19/12* (2014.11); *H04N 19/124* (2014.11); *H04N 19/13* (2014.11);
(Continued)

(58) Field of Classification Search
CPC ...... H04N 19/107; H04N 19/12; H04N 19/94; H04N 19/176
See application file for complete search history.

(56) References Cited

U.S. PATENT DOCUMENTS 9,172,968 B2 * 10/2015 Karczewicz ......... H04N 19/122
2007/0019726 A1 * 1/2007 Cha ....................... H04N 19/176
375/240.12

FOREIGN PATENT DOCUMENTS

EP 1549074 A1 * 6/2005 ........... H04N 19/176
EP 1549074 A1 6/2005

OTHER PUBLICATIONS

English Translation of the Written Opinion of the International Searching Authority dated May 4, 2016 for corresponding International Application No. PCT/FR2016/050374, filed Feb. 18, 2016.
(Continued)

*Primary Examiner* — Tsion B Owens
(74) *Attorney, Agent, or Firm* — David D. Brush; Westman, Champlin & Koehler, P.A.

(57) ABSTRACT

A method for encoding at least one image divided into blocks. The method implements, for a current block to be encoded: determining a first prediction type for the current block; determining a prediction procedure associated with the first prediction type; obtaining a predictor block on the basis of the determined prediction procedure; and calculating a residual block that represents the difference between the predictor block obtained and the current block. The method also includes: selecting a prediction procedure from among a plurality of prediction procedures of a second type, different from the first type; and encoding the residual block calculated by using an encoding parameter determined on the basis of the selected prediction procedure.

12 Claims, 10 Drawing Sheets

(51) Int. Cl.
*H04N 19/176* (2014.01)
*H04N 19/13* (2014.01)
*H04N 19/94* (2014.01)
*H04N 19/124* (2014.01)
*H04N 19/147* (2014.01)
*H04N 19/194* (2014.01)

(52) U.S. Cl.
CPC ......... *H04N 19/147* (2014.11); *H04N 19/176* (2014.11); *H04N 19/194* (2014.11); *H04N 19/94* (2014.11)

(56) References Cited

OTHER PUBLICATIONS

International Search Report dated May 4, 2016 for corresponding International Application No. PCT/FR2016/050374, filed Feb. 18, 2016.

Van Ye et al., "Improved h.264 intra coding based on bi-directional intra prediction, directional transform, and adaptive coefficient scanning", 15th IEEE International Conference on Image Processing ,, ICIP 2008, San Diego, Cali Fornia, USA, Oct. 12-15, 2008, IEEE. Piscataway, NJ, USA. Oct. 12, 2008 (Oct. 12, 2008), pp. 2116-2119, XP031374452.

Xin Zhao et al., "CE7: Mode-dependent transform, residual reordering and coefficient scanning for intra prediction residue", 4, JCT-VC Meeting; 95, MPEG Meeting; Jan. 20, 2011-Jan. 28, 2011; Daegu; (Joint Collaborative Team on Video Coding of ISO/IEC JTC1/SC29/WG11and ITU-T SG.6 ); URL: http://wftP3.itu.int/av-arch/jctvc-site/,, no, JCTVC-D284, Jan. 15, 2011 (Jan. 15, 2011), XP030008324.

Thomas Wiegand et al., "Rate-Distortion Optimized Mode Selection for Very Low Bit Rate Video Coding and the Emerging H.263 Standard", IEEE Transactions on Circuits and Systems for Video Technology, IEEE Service Center, Piscataway, NJ, US, vol. 6. No. 2, 1 Apr. 1, 1996 (Apr. 1, 1996), XP011014299.

Gary J Sullivan et al., "Overview of the High Efficiency Video Coding (HEVC) Standard", IEEE Transactions on Circuits and Systems for Video Technology. IEEE Service Center, Piscataway, NJ, US, vo 1, 22. No. 12, Dec. 1, 2012 (Jan. 1, 2012), pp. 1649-1668, XP011486324.

Written Opinion of the International Searching Authority dated May 4, 2016 for corresponding International Application No. PCT/FR2016/050374, filed Feb. 18, 2016.

* cited by examiner

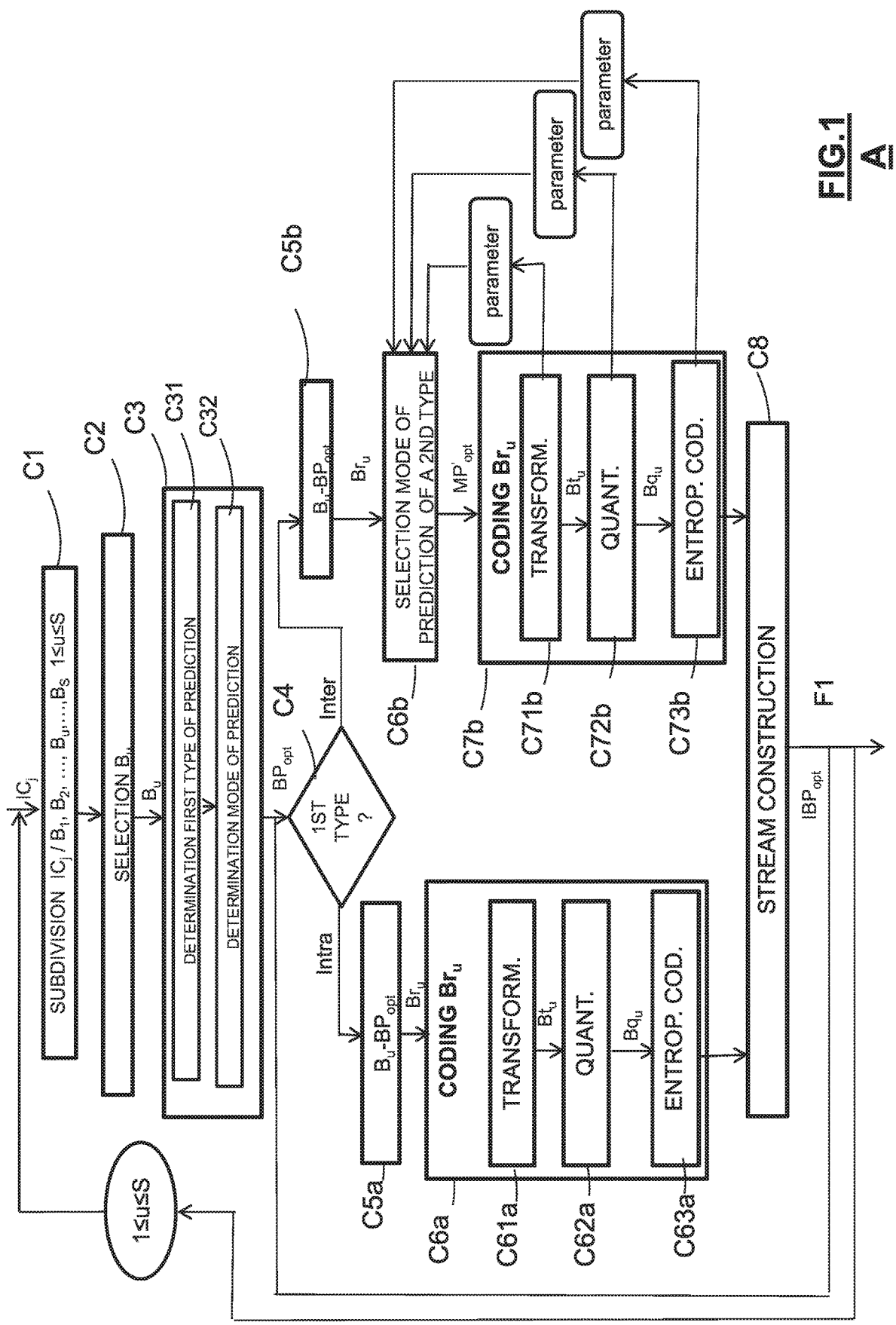

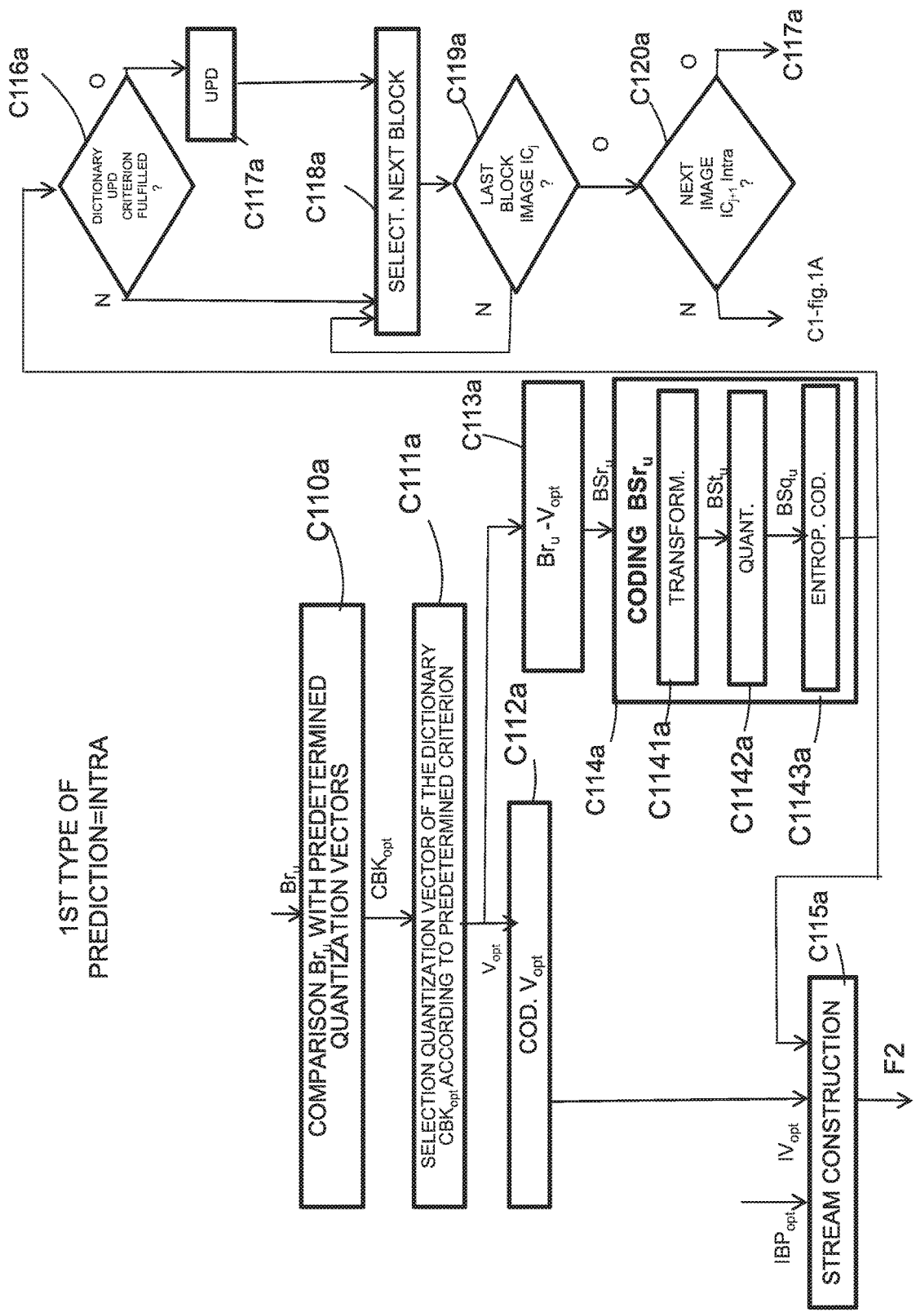

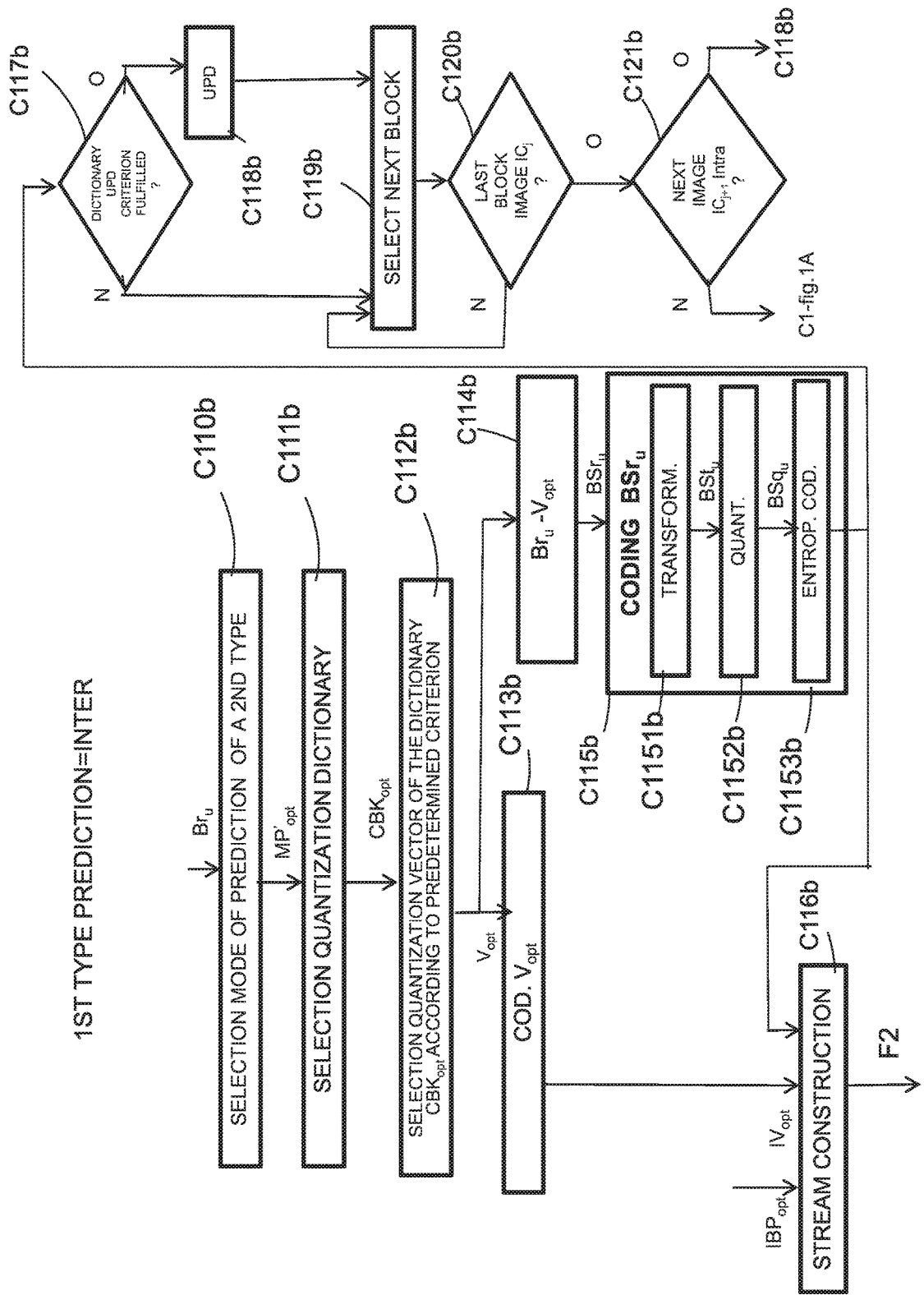

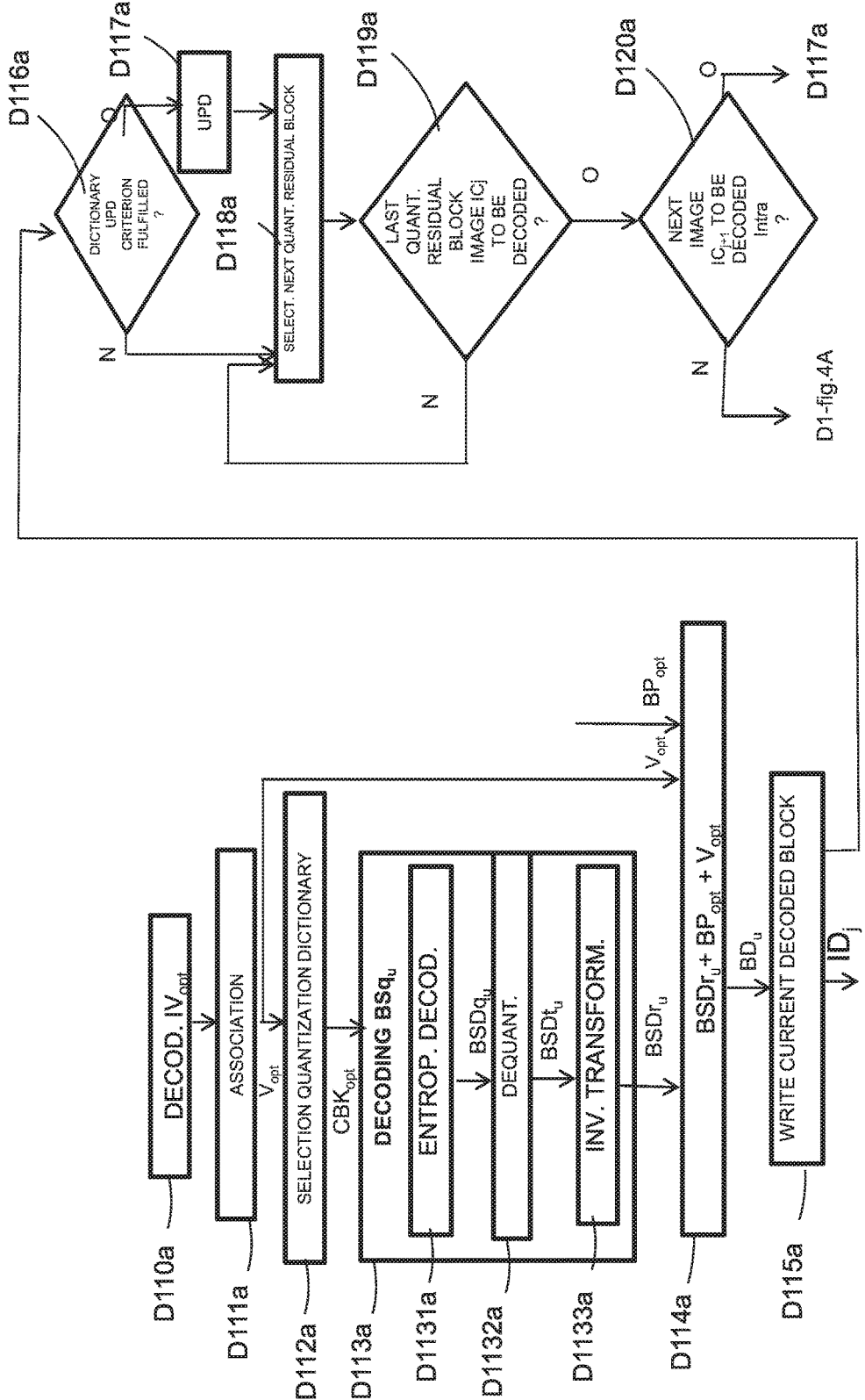

FIG.4C
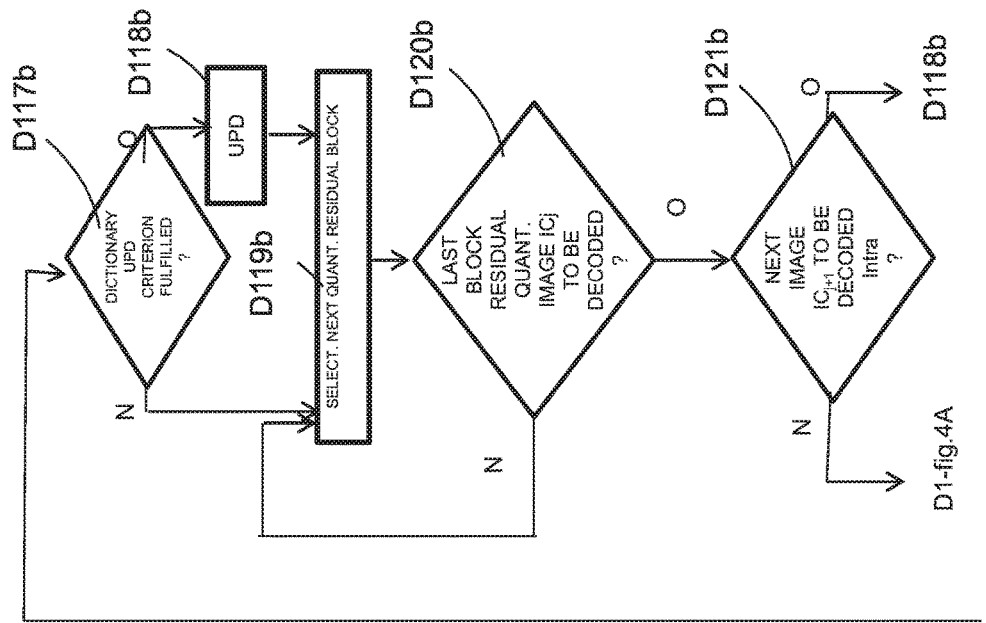
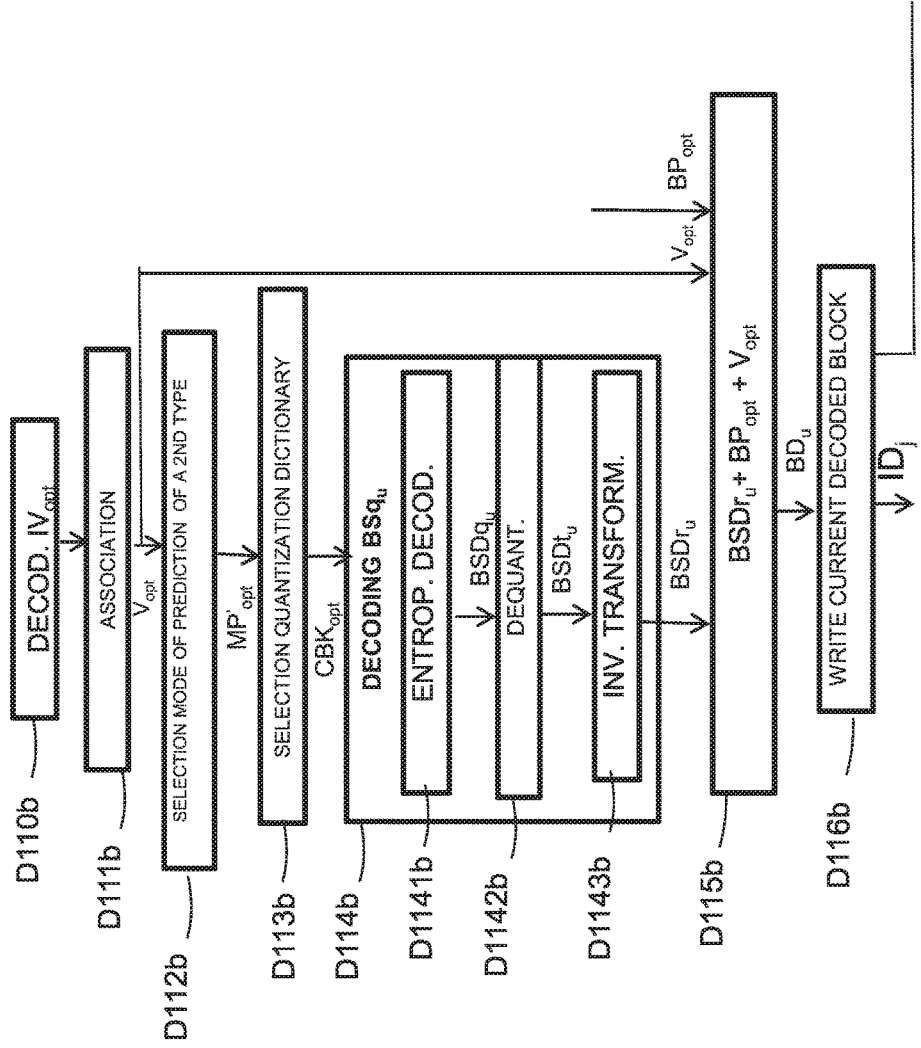
1ST TYPE OF INVERSE PREDICTION=INTER

IMAGE ENCODING AND DECODING METHOD, ENCODING AND DECODING DEVICE AND CORRESPONDING COMPUTER PROGRAMS

CROSS-REFERENCE TO RELATED APPLICATIONS

This Application is a Section 371 National Stage Application of International Application No. PCT/FR2016/050374, filed Feb. 18, 2016, which is incorporated by reference in its entirety and published as WO 2016/132075 A1 on Aug. 25, 2016, not in English.

FIELD OF THE INVENTION

The present invention pertains generally to the field of image processing and more precisely to the coding and to the decoding of digital images and of sequences of digital images.

The invention can be applied in particular, but not exclusively, to the video coding implemented in current AVC and HEVC video coders and their extensions (MVC, 3D-AVC, MV-HEVC, 3D-HEVC, etc), as well as to the corresponding decoding.

BACKGROUND OF THE INVENTION

Current video coders (MPEG, H.264, HEVC, ... ) use a block-wise representation of the images to be coded. The images are subdivided into blocks of square or rectangular shape, which are liable to be subdivided in their turn in a recursive manner.

For at least one block considered from among the various blocks obtained, a prediction of pixels of the block considered is implemented with respect to prediction pixels which belong either to the same image (Intra prediction), or to one or more previous images of a sequence of images (Inter prediction) which have already been decoded. Such previous images are conventionally called reference images and are preserved in memory either at the coder or at the decoder. In the course of such a prediction, a residual block is calculated by subtracting the pixels of the block considered, from the prediction pixels. The coefficients of the calculated residual block are then quantized after a possible mathematical transformation, for example of discrete cosine transform (DCT) type, and then coded by an entropy coder. The coded data are written into a data signal intended to be transmitted to a decoder.

Said data signal comprises in particular:
the type of prediction (Intra prediction, Inter prediction, default prediction carrying out a prediction for which no information is transmitted to the decoder ("skip"));
the mode of prediction (direction of prediction, reference image component, . . . );
the type of subdivision into sub-blocks;
the type of transform, for example 4×4 DCT, 8×8 DCT, etc. . . . ;
the values of pixels, the values of transformed coefficients, amplitudes, signs of quantized coefficients of the pixels contained in the block or the sub-block considered.

Once the data signal has been received by the decoder, the decoding is done image by image, and for each image, block by block. For each block, the corresponding elements of the data signal are read. The inverse quantization and the inverse transformation of the coefficients of the blocks are performed to produce a decoded residual block. Next, the prediction of the block is calculated and the block is reconstructed by adding the prediction to the decoded residual block.

More precisely:
an Intra prediction of a block of a current image consists in predicting pixels of this block with respect to pixels of the current image which have already been coded and then decoded and which may be situated in various predetermined directions, for example thirty-five in the HEVC standard,
an Inter prediction of a block of a current image consists in predicting certain coding information associated with this block, such as for example:
the temporal motion vector of the current block with respect to a temporal motion vector associated with a block of reference pixels,
the pixels of the current block with respect to the pixels of a block of reference pixels which is pointed at by the temporal motion vector and which is situated in an image other than the current image to which the current block belongs.

Such types of prediction are very different from one another. Sometimes, it turns out that the type of prediction (e.g.: Inter) selected in such a coding/decoding scheme is poorly suited to the current block to be coded/decoded.

This results in unsatisfactory compression performance.

OBJECT AND SUMMARY OF THE INVENTION

One of the aims of the invention is to remedy drawbacks of the aforementioned prior art.

For this purpose, a subject of the present invention relates to a method for coding at least one image split into blocks, implementing, for a current block to be coded:
a determination of a first type of prediction of the current block,
a determination of a mode of prediction associated with the first type of prediction,
an obtaining of a predictor block on the basis of the mode of prediction determined,
a calculation of a residual block which is representative of the difference between the predictor block obtained and the current block.

The coding method according to the invention is noteworthy in that it comprises:
a selection of a mode of prediction from among a plurality of modes of prediction according to a second type, different from the first type,
a coding of the residual block calculated with the aid of a coding parameter determined on the basis of the prediction mode selected.

Such a provision makes it possible to increase the optimization of the current block's compression such as already obtained subsequent to the implementation of the first type of prediction, by refining this first type of prediction by a coding parameter associated with a prediction of the current block of a second type. The prediction of the current block is thus more precise, this having the advantage of significantly improving compression performance in respect of the data signal to be transmitted to the decoder.

According to the invention, a type of prediction groups together a set of predictors each associated with one and the same parameter or with one and the same set of parameters.

In the case of a prediction which is for example of Intra type, the prediction parameter is the direction of prediction selected from among a set of predetermined directions of prediction (for example 35 directions in the HEVC standard).

In the case of a prediction which is for example of Inter type, at least the following two prediction parameters are considered:

the index of the motion vector which describes the motion between the pixels of the current block and the pixels of a block which has already been coded or else which has already been coded and then decoded and which belongs to an image other than the current image, the index of this other image.

In a particular embodiment, the selection of the mode of prediction is implemented as a function of the predictor block obtained on the basis of the mode of prediction associated with the first type of prediction.

Such a provision advantageously makes it possible to take account of the predictor block obtained on the basis of the mode of prediction associated with the first type of prediction, which block is the best predictor of the original block to be coded. Therefore, such a predictor block is the best suited to determining the candidate block associated with the prediction mode selected from among a plurality of modes of prediction according to a second type.

In another particular embodiment, the selected mode of prediction is that on the basis of which a predictor block is obtained which, from among other candidate predictor blocks, minimizes the distortion between the predictor block obtained on the basis of the mode of prediction associated with the first type of prediction and each of the candidate predictor blocks.

Such a provision makes it possible, when a certain type of prediction is implemented on coding, to select another type of prediction which is able to generate residual blocks close to the residual block as calculated in accordance with said certain type of prediction. Such a provision makes it possible to adapt the coding of the residual block of one type of prediction to the other.

In yet another particular embodiment, the coding parameter belongs to the group comprising:
 a transform operation,
 a dictionary of quantization vectors,
 an entropy coder,
 a scalar quantization operation.

The various aforementioned embodiments or characteristics of realization can be added independently or in combination with one another, to the operations implemented in the course of the coding method such as defined hereinabove.

Correlatively, the invention relates to a device for coding at least one image split into blocks, comprising, for a current block to be coded:
 a prediction module for determining:
 a first type of prediction of the current block,
 a mode of prediction associated with the first type of prediction,
 the prediction module delivering a predictor block on the basis of the mode of prediction determined,
 a module for calculating a residual block which is representative of the difference between the predictor block delivered and the current block.

Such a coding device is noteworthy in that it comprises:
 a module for selecting a mode of prediction from among a plurality of modes of prediction according to a second type, different from the first type,
 a module for coding the residual block calculated with the aid of a coding parameter determined on the basis of the prediction mode selected.

In a corresponding manner, the invention also relates to a method for decoding a data signal representative of at least one image having been split into blocks, implementing, for a current block to be decoded:
 a determination, in the data signal, of a residual block relating to the current block to be decoded,
 a determination of a first type of prediction of the current block,
 a determination of a mode of prediction associated with the first type of prediction,
 an obtaining of a predictor block on the basis of the mode of prediction determined.

Such a decoding method is noteworthy in that it comprises:
 a selection of a mode of prediction from among a plurality of modes of prediction of a second type, different from said first type,
 a reconstruction of the current block on the basis of the residual block determined, of the predictor block obtained and of a decoding parameter determined on the basis of the prediction mode selected.

In a particular embodiment, the selection of the mode of prediction is implemented as a function of the predictor block obtained on the basis of the mode of prediction associated with the first type of prediction.

In another particular embodiment, the selected mode of prediction is that on the basis of which a predictor block is obtained which, from among other candidate predictor blocks, minimizes the distortion between the predictor block obtained on the basis of the mode of prediction associated with the first type of prediction and each of the candidate predictor blocks.

In yet another particular embodiment, the decoding parameter belongs to the group comprising:
 a transform operation,
 a dictionary of quantization vectors,
 an entropy decoder,
 a scalar quantization operation.

The various aforementioned embodiments or characteristics of realization can be added independently or in combination with one another, to the operations implemented in the course of the decoding method such as defined hereinabove.

Correlatively, the invention relates to a device for decoding a data signal representative of at least one coded image having been split into blocks, comprising, for a current block to be decoded:
 a module for determining, in the data signal, a residual block relating to the current block to be decoded,
 a prediction module for determining:
 a first type of prediction of the current block,
 a mode of prediction associated with the first type of prediction,
 the prediction module delivering a predictor block on the basis of the mode of prediction determined.

Such a decoding device is noteworthy in that it comprises:
 a module for selecting a mode of prediction from among a plurality of modes of prediction of a second type, different from said first type,
 a module for reconstructing the current block on the basis of the residual block determined, of the predictor block delivered and of a decoding parameter determined on the basis of the prediction mode selected.

The invention further relates to a computer program comprising instructions for implementing one of the coding and decoding methods according to the invention, when it is executed on a computer.

Such a program can use any programming language, and be in the form of source code, object code, or of code intermediate between source code and object code, such as in a partially compiled form, or in any other desirable form.

Yet another subject of the invention also envisages a recording medium readable by a computer, and comprising computer program instructions, such as mentioned hereinabove.

The recording medium can be any entity or device capable of storing the program. For example, the medium can comprise a storage means, such as a ROM, for example a CD ROM or a microelectronic circuit ROM, or else a magnetic recording means, a digital recording means, for example a USB key or a hard disk.

Moreover, such a recording medium can be a transmissible medium such as an electrical or optical signal, which can be conveyed via an electrical or optical cable, by radio or by other means. The program according to the invention can be in particular downloaded from a network of Internet type.

Alternatively, such a recording medium can be an integrated circuit in which the program is incorporated, the circuit being adapted to execute the method in question or to be used in the execution of the latter.

BRIEF DESCRIPTION OF THE DRAWINGS

Other characteristics and advantages will become apparent on reading preferred embodiments described with reference to the figures in which:

FIG. 1A represents the steps of the coding method according to a first embodiment of the invention, FIG. 1B represents a first alternative of the coding method according to a second embodiment of the invention, FIG. 1C represents a second alternative of the coding method according to a second embodiment of the invention, FIG. 4B represents a first alternative of the decoding method according to a second embodiment of the invention, FIG. 4C represents a second alternative of the decoding method according to a second embodiment of the invention.

DETAILED DESCRIPTION OF THE CODING PART

A first embodiment of the invention will now be described, in which the coding method according to the invention is used to code an image or a sequence of images according to a binary stream close to that which is obtained by a coding implemented in a coder in accordance with any one of the current or forthcoming video coding standards.

In this first embodiment, the coding method according to the invention is for example implemented in a software or hardware manner by modifications of such a coder. The coding method according to the invention is represented in the form of an algorithm comprising steps C1 to C8 such as represented in FIG. 1A.

Figure 2A:
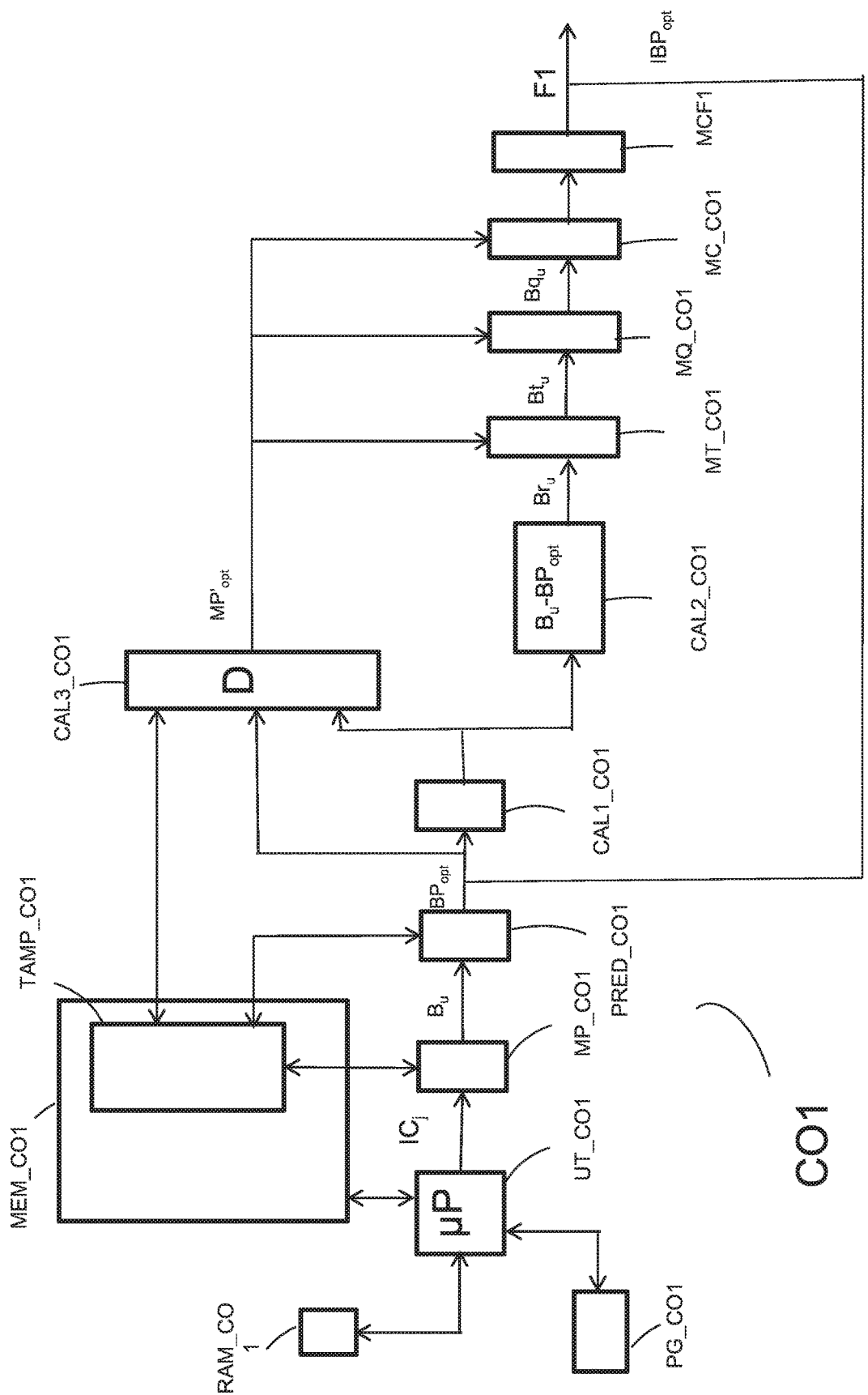
FIG. 2A represents a coding device according to a first embodiment of the invention.

According to the first embodiment of the invention, the coding method according to the invention is implemented in a coding device CO1 represented in FIG. 2A.

As illustrated in FIG. 2A, such a coding device comprises a memory MEM_CO1 comprising a buffer memory TAMP_CO1, a processing unit UT_CO1 equipped for example with a microprocessor μP and driven by a computer program PG_CO1 which implements the coding method according to the invention. On initialization, the code instructions of the computer program PG_CO1 are for example loaded into a RAM memory denoted RAM_CO1, before being executed by the processor of the processing unit UT_CO1.

The coding method represented in FIG. 1A applies to any current image $IC_j$ which is fixed or else which forms part of a sequence of L images $IC_1, \ldots, IC_j, \ldots, IC_L$ ($1 \leq j \leq L$) to be coded.

In the course of a step C1 represented in FIG. 1A, there is undertaken, in a manner known per se, the splitting of a current image $IC_j$ into a plurality of blocks $B_1, B_2, \ldots, B_u, \ldots, B_S$ ($1 \leq u \leq S$). Such a partitioning step is implemented by a partitioning software module MP_CO1 represented in FIG. 2A, which module is driven by the microprocessor μP of the processing unit UT_CO1. It should be noted that within the meaning of the invention, the term "block" signifies coding unit. The latter terminology is in particular used in the HEVC standard "ISO/IEC/23008-2 Recommendation ITU-T H.265 High Efficiency Video Coding (HEVC)".

In particular, such a coding unit groups together sets of pixels of rectangular or square shape, also called blocks or macroblocks, or else sets of pixels exhibiting other geometric shapes.

Said blocks $B_1, B_2, \ldots, B_u, \ldots, B_S$ are intended to be coded according to a predetermined scanning order, which is for example of the lexicographic type. This signifies that the blocks are coded one after another, from left to right.

Other types of traversal are of course possible. Thus, it is possible to cut the image $IC_j$ up into several sub-images called slices and to apply a cutting of this type to each sub-image independently. It is also possible to code not a succession of rows, as explained hereinabove, but a succession of columns. It is also possible to traverse the rows or columns in either direction.

According to an example, the blocks $B_1, B_2, \ldots, B_u, \ldots, B_S$ have a square shape and all contain K pixels, with $K \geq 1$. According to a preferred embodiment, said blocks are 4×4 or 8×8 pixels in size.

As a function of the size of the image which is not necessarily a multiple of the size of the blocks, the last blocks on the left and the last blocks at the bottom might not be square. In an alternative embodiment, the blocks may be for example of rectangular size and/or not aligned with one another.

Each block may moreover be itself divided into sub-blocks which are themselves subdividable.

In the course of a step C2 represented in FIG. 1A, the coder CO1 selects as current block a first block to be coded $B_u$ of the image $IC_j$, such as for example the first block $B_1$.

In the course of a step C3 represented in FIG. 1A, there is undertaken the prediction of a first type of the current block $B_u$. Step C3 comprises:

a sub-step C31 of determining a first type of prediction of the current block, for example Intra or Inter, a sub-step C32 of determining a mode of prediction associated with the first type of prediction determined.

In the case where the first type of prediction determined is Intra, the mode of prediction comprises at least one prediction parameter which is a direction of prediction selected from among a set of predetermined directions of prediction (for example 35 directions in the HEVC standard).

In the case where the first type of prediction determined is Inter, the mode of prediction comprises at least the following two prediction parameters:
- the index of the motion vector which describes the motion between the pixels of the current block and the pixels of a block which has already been coded or else which has already been coded and then decoded and which belongs to an image other than the current image,
- the index of this other image.

According to a preferred embodiment, the first type of prediction determined is Inter. In a manner known per se, the block $B_u$ is then predicted with respect to a plurality of candidate predictor blocks. Each of the candidate predictor blocks is a block of pixels which has already been coded or else which has already been coded and then decoded. Such predictor blocks are stored beforehand in the buffer memory TAMP_CO1 of the coder CO1, such as represented in FIG. 2A.

On completion of the prediction step C3, an optimal predictor block $BP_{opt}$ is obtained subsequent to a setting into competition of said candidate predictor blocks, for example by minimizing a distortion bitrate criterion well known to the person skilled in the art. The block $BP_{opt}$ is considered to be an approximation of the current block $B_u$. The information relating to this prediction is intended to be written into a data signal or stream F1 to be transmitted to a decoder which will be described in greater detail in the subsequent description.

Step C3 is implemented by a predictive coding software module or processor PRED_CO1 represented in FIG. 2A, which is driven by the microprocessor μP of the processing unit UT_CO1.

In the course of a step C4 represented in FIG. 1A, in accordance with the invention, there is undertaken a verification of the first type of prediction applied to the current block $B_u$ during step C3.

Step C4 is implemented by a calculation software module or processor CAL1_CO1 represented in FIG. 2A, which is driven by the microprocessor μP of the processing unit UT_CO1.

In the case where the applied prediction of a first type is an Intra prediction, there is conventionally undertaken, in the course of a step C5a) represented in FIG. 1A, the comparison of the data relating to the current block $B_u$ with the data of the predictor block $BP_{opt}$. More precisely, in the course of this step, there is undertaken the calculation of the difference between the current block $B_u$ and the predictor block $BP_{opt}$ obtained.

A set of residual data, called a residual block $Br_u$ is then obtained on completion of step C5a).

Step C5a) is implemented by a software module or processor CAL2_CO1 for calculating residual data such as is represented in FIG. 2A, which is driven by the microprocessor μP of the processing unit UT_CO1.

In the course of a step C6a) represented in FIG. 1A, there is conventionally undertaken a coding of the data of the residual block $Br_u$.

In a manner known per se, in the course of step C6a), there is undertaken, in the course of a sub-step C61a), a transformation of the residual block $Br_u$ according to a conventional direct transformation operation, to produce a transformed block $Bt_u$.

Sub-step C61a) is implemented by a transformation software module or processor MT_CO1 represented in FIG. 2A, which is driven by the microprocessor μP of the processing unit UT_CO1.

The processor MT_CO1 is able to implement a direct transformation such as for example a discrete cosine transformation of DCT type (the abbreviation standing for "Discrete Cosine Transform"), a discrete sine transformation of DST type (the abbreviation standing for "Discrete Sine Transform"), a discrete wavelet transformation of DWT type (the abbreviation standing for "Discrete Wavelet Transform").

In a manner known per se, in the course of step C6a), there is furthermore undertaken, in the course of a sub-step C62a) represented in FIG. 1A, a quantization of the data of the transformed block $Bt_u$, to produce a quantized block $Bq_u$ made up of quantized coefficients. Such a quantization step is for example of scalar or vector type.

Sub-step C62a) is performed by means of a quantization software module or processor MQ_CO1 such as represented in FIG. 2A, which module is driven by the microprocessor μP of the processing unit UT_CO1.

In a manner known per se, in the course of step C6a), there is furthermore undertaken, in the course of a sub-step C63a) represented in FIG. 1A, the coding of the quantized coefficients of the block $Bq_u$. Such a coding is for example an entropy coding of CABAC type ("Context Adaptive Binary Arithmetic Coding") or else an entropy coding of arithmetic or Huffman type.

Sub-step C63a) is implemented by a coding software module or processor MC_CO1 represented in FIG. 2A, which module is driven by the microprocessor μP of the processing unit UT_CO1.

In the case where the first type of prediction applied is Inter, there is firstly conventionally undertaken, in the course of a step C5b) represented in FIG. 1A, the comparison of the data relating to the current block $B_u$ with the data of the predictor block $BP_{opt}$. More precisely, in the course of this step, there is undertaken the calculation of the difference between the current block $B_u$ and the predictor block $BP_{opt}$ obtained.

A set of residual data, called a residual block $Br_u$ is then obtained on completion of step C5b).

Step C5b) is implemented by the software module or processor CAL2_CO1 for calculating residual data, represented in FIG. 2A.

Next, in accordance with the invention, there is undertaken, in the course of a step C6b) represented in FIG. 1A, the selection of a mode of prediction associated with a prediction of a second type, different from said aforementioned first type. According to a preferred embodiment, the prediction of the second type is an Intra prediction which is, in a manner known per se, associated with a plurality of modes of prediction each defined by a predetermined direction of prediction. In the case of the Intra prediction for example proposed in the HEVC standard, there exist thirty-five possible directions of prediction, thus amounting to determining thirty-five candidate predictor blocks available for the prediction of the current block $B_u$. According to the invention, step C6b) consists in selecting from among the available candidate predictor blocks, the candidate predictor which minimizes the distortion between the optimal predictor block $BP_{opt}$ which was obtained on completion of the aforementioned step C3 of prediction of a first type and each of said available candidate predictor blocks. In the same manner as in the case of the prediction of the aforementioned first type, each of the candidate predictor blocks set in competition in the course of step C6b) is a block of pixels which has already been coded or else coded and then decoded. Such predictor blocks are stored beforehand in the buffer memory TAMP_CO1 of the coder CO1, such as represented in FIG. 2A.

On completion of step C6b), an optimal predictor block $BP'_{opt}$ is obtained. Such an optimal predictor block $BP'_{opt}$ is then associated with its optimal mode of prediction $MP'_{opt}$ which represents the mode of prediction of a second type selected according to the invention.

Step C6b) is implemented by a calculation software module or processor CAL3_CO1 such as represented in FIG. 2A, which is driven by the microprocessor μP of the processing unit UT_CO1.

In the course of a step C7b) represented in FIG. 1A, in accordance with the invention, there is undertaken a coding of the data of the residual block $Br_u$ with the aid of at least one coding parameter determined on the basis of the mode of prediction $MP'_{opt}$ selected in step C6b).

In the course of step C7b), there is undertaken, in the course of a sub-step C71b), a transformation of the residual block $Br_u$ according to a conventional direct transformation operation, to produce a transformed block $Bt_u$.

According to one embodiment of the invention, the direct transformation operation is chosen as being a transformation specific to the prediction mode selected in step C6b). According to a first example, if the Intra prediction mode selected is mode 0 or 1 of the HEVC standard, the direct transformation most suited to this mode being the DST transformation, it is the latter which is chosen. According to a second example, if the Intra prediction mode selected is one of modes 2 to 34 of the HEVC standard, the direct transformation most suited to this mode being the DCT transformation, it is the latter which is chosen.

Sub-step C71b) is implemented by the transformation software module or processor MT_CO1 represented in FIG. 2A.

In the course of step C7b), there is furthermore undertaken, in the course of a sub-step C72b) represented in FIG. 1A, a quantization of the data of the transformed block $Bt_u$, to produce a quantized block $Bq_u$ made up of quantized coefficients. Such a quantization step is for example of scalar or vector type.

According to one embodiment of the invention, alternatively to the selection of the transformation performed in sub-step C71b) or in combination with this selection, the quantization operation is chosen as being a quantization specific to the prediction mode selected in step C6b). According to a first example, if the Intra prediction mode selected is mode 0, 1 or 26 of the HEVC standard, it is the quantization step specific to the HEVC standard which is chosen as being the most suited to this mode. According to a second example, if the Intra prediction mode selected is one of modes 2 to 25, 27 to 34 of the HEVC standard, the quantization step most suited to this mode is double the quantization step specific to the HEVC standard. Such a provision makes it possible to adapt the quantization to the specific energy of the decoded block $BD_u$ calculated on the basis of the predictor block $BP_{opt}$ obtained in step C3.

Sub-step C72b) is performed by means of the quantization software module or processor MQ_CO1 represented in FIG. 2A.

In the course of step C7b), there is furthermore undertaken, in the course of a sub-step C73b) represented in FIG. 1A, the coding of the quantized coefficients of the block $Bq_u$. Such a coding is for example an entropy coding of CABAC type ("Context Adaptive Binary Arithmetic Coding") or else an entropy coding of arithmetic or Huffman type.

According to one embodiment of the invention, alternatively to the selection of the transformation performed in sub-step C71b) and/or to the selection of the quantization performed in sub-step C72b), or else in combination with one and/or the other of these selections, the entropy coding operation is chosen as being a coding operation specific to the prediction mode selected in step C6b). Stated otherwise, the probabilities used for the coding of the coefficients of the block $Bq_u$ depend on the mode of prediction $MP'_{opt}$ selected in step C6b). For example, if the Intra prediction mode selected makes it possible to obtain a residual block $Br_u$ of low amplitude, the probability of occurrence of low-amplitude coefficients is increased. Conversely if the Intra prediction mode selected makes it possible to obtain a residual block $Br_u$ of high amplitude, the probability of occurrence of low-amplitude coefficients is decreased.

Sub-step C73b) is implemented by the coding software module or processor MC_CO1 represented in FIG. 2A.

In the course of a step C8 represented in FIG. 2A, there is undertaken the construction of a data signal or stream F1 which contains the coded data on completion either of aforementioned step C6a) or step C7b).

Step C8 is implemented by a data signal construction software module or processor MCF1, such as represented in FIG. 2A.

The data signal F1 is thereafter transmitted by a communication network (not represented) to a remote terminal. The latter comprises the decoder DO1 represented in FIG. 3A.

In a manner known per se, the data signal F1 furthermore comprises certain information encoded by the coder CO1, such as the first type of prediction (Inter or Intra) applied in step C3, and if appropriate, the prediction mode selected, the index of the predictor block obtained $BP_{opt}$ obtained on completion of step C3, denoted $IBP_{opt}$, the type of partitioning of the current block $B_u$ if the latter has been partitioned, the reference image index and the motion vector that are used in the Inter mode of prediction.

In a manner known per se, there is thereafter undertaken the decoding of the residual block $Br_u$. A decoded residual block $BDr_u$ is then obtained. There is then undertaken the construction of the decoded block $BD_u$, by adding to the predicted block $BP_{opt}$ the decoded residual block $BDr_u$.

It should be noted that the decoded block $BD_u$ is the same as the decoded block obtained on completion of the method for decoding the image $IC_j$ which will be described further on in the description. The decoded block $BD_u$ is thus rendered available to be used by the coder CO1 represented in FIG. 2A.

The coding steps C1 to C8 which have just been described hereinabove are thereafter implemented for each of the blocks $B_1, B_2, \ldots, B_u, \ldots, B_S$ to be coded of the current image $IC_j$ considered.

A second embodiment of the invention will now be described with reference to FIGS. 1B, 1C and 2B. In this second embodiment, each block to be coded is subjected to a coding by scalar quantization, as was described with reference to FIG. 1A, which is advantageously combined with a coding by vector quantization.

Figure 2B:
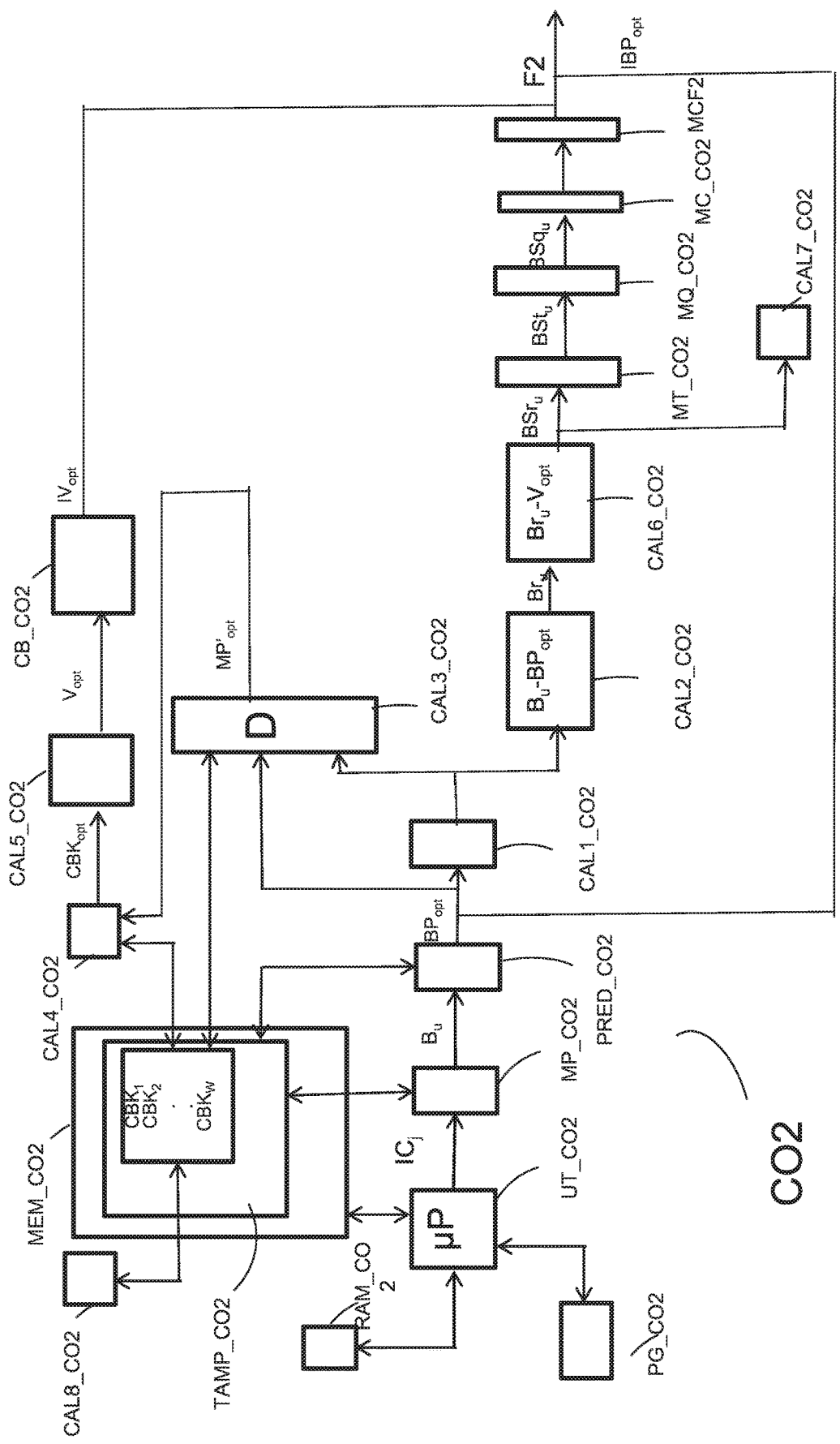
FIG. 2B represents a coding device according to a second embodiment of the invention.

According to the second embodiment, the coding method according to the invention is implemented in a coding device CO2 represented in FIG. 2B. As illustrated in FIG. 2B, such a coding device comprises a memory MEM_CO2 comprising a buffer memory TAMP_CO2, a processing unit UT_CO2 equipped for example with a microprocessor μP and driven by a computer program PG_CO2 which implements the coding method according to the invention. On initialization, the code instructions of the computer program PG_CO2 are for example loaded into a RAM memory denoted RAM_CO2, before being executed by the processor of the processing unit UT_CO2.

Furthermore, the coder CO2 comprises software modules or processors MP_CO2, PRED_CO2, CAL1_CO2, CAL3_CO2 which are respectively identical to the software modules or processors MP_CO1, PRED_CO1, CAL1_CO1, CAL3_CO1 of the coder CO1 represented FIG. 2A. For this reason, the software modules or processors MP_CO2, PRED_CO2, CAL1_CO2, CAL3_CO2 will not be described again in detail.

FIG. 1B describes more precisely how the vector quantization is implemented when it has been verified, on completion of step C4 of FIG. 1A, that the first type of prediction is Intra.

In the same manner as in the first embodiment, there is undertaken the calculation of a residual block $Br_u$. Such a step being identical to step C5a) of FIG. 1A, it will not be described again.

Subsequent to the calculation of the residual block $Br_u$, in the course of a step C110a) represented in FIG. 1B, there is undertaken a comparison of the first residual block $Br_u$ with a plurality of quantization vectors. In a manner known per se, these quantization vectors belong to one or more dictionaries of quantization vectors available to the coder, denoted $CBK_1$, $CBK_2$, ..., $CBK_W$. Such dictionaries are stored beforehand in the buffer memory TAMP_CO2 of the coder CO2, such as represented in FIG. 2B.

More precisely, step C110a) consists in selecting a dictionary of quantization vectors from among the available dictionaries $CBK_1$, $CBK_2$, ..., $CBK_W$.

Step C110a) is implemented by a calculation software module or processor CAL4_CO2 such as represented in FIG. 2B, which is driven by the microprocessor μP of the processing unit UT_CO2.

In accordance with the invention, such a selection is implemented as a function of one and/or of the other of the following elements:
the characteristics of the prediction (for example, the Intra mode chosen from among the 35 Intra modes of the HEVC standard) which was applied in step C3 of FIG. 1A,
the frequency characteristics of the predictor block $BP_{opt}$,
the size of the current block $B_u$,
characteristics of the current image $IC_j$, such as its size or its energy.

In the preferred embodiment, W=70, that is to say that:
in the case of a current block $B_u$ of size 4×4, there exists a different dictionary for each of the 35 Intra modes considered in the HEVC standard,
in the case of a current block $B_u$ of size 8×8, there exists a different dictionary for each of the 35 Intra modes considered in the HEVC standard.

In accordance with this preferred embodiment, the dictionary selected therefore depends both on the size of the current block $B_u$ and on the prediction mode selected.

The dictionary selected on completion of step C110a) is denoted $CBK_{opt}$.

In the course of a step C111a) represented in FIG. 1B, there is undertaken a selection of one of the quantization vectors of the dictionary $CBK_{opt}$ which was selected in step C110a).

An optimal quantization vector $V_{opt}$ is obtained subsequent to a setting into competition of said quantization vectors of the dictionary $CBK_{opt}$, for example:
either by minimizing a distortion bitrate criterion well known to the person skilled in the art,
or by minimizing the mean square error calculated between the data of the residual block $Br_u$ and the corresponding data of each of the quantization vectors of the dictionary $CBK_{opt}$.

The optimal quantization vector $V_{opt}$ is considered to be an approximation of the residual block $Br_u$. The information relating to this prediction is intended to be written into the aforementioned data signal F2.

Step C111a) is implemented by a calculation software module or processor CAL5_CO2 such as represented in FIG. 2B, which is driven by the microprocessor μP of the processing unit UT_CO2.

In the course of a step C112a) represented in FIG. 1B, there is undertaken a coding of the quantization vector $V_{opt}$ selected on completion of step C111a). Such a step consists in representing the index denoted $IV_{opt}$ of the quantization vector $V_{opt}$ in binary form. For example, if the dictionary $CBK_{opt}$ to which the quantization vector $V_{opt}$ belongs contains 256 quantization vectors, then the quantization vector $V_{opt}$ can be represented on 8 bits, thereby making it possible to precisely identify this vector from among all the other quantization vectors of the dictionary $CBK_{opt}$.

Step C112a) is implemented by a binary coding software module or processor CB_CO2 such as represented in FIG. 2B, which is driven by the microprocessor μP of the processing unit UT_CO2.

In the course of a step C113a) represented in FIG. 1B, there is undertaken the comparison of the data relating to the residual block $Br_u$ with the data of the vector $V_{opt}$. More precisely, in the course of this step, there is undertaken the calculation of the difference between the residual block $Br_u$ and the vector $V_{opt}$.

A second set of data, called a secondary residual block $BSr_u$, is then obtained on completion of step C113a).

Step C113a) is implemented by the software module or processor CAL6_CO2 represented in FIG. 2B.

In the course of a step C114a) represented in FIG. 1B, there is undertaken, in accordance with the invention, a coding of the data of the secondary residual block $BSr_u$.

In the course of step C114a), there is undertaken, in the course of a sub-step C1141a), a transformation of the secondary residual block $BSr_u$ according to a conventional direct transformation operation, to produce a transformed block $BSt_u$.

Sub-step C1141a) is implemented by the transformation software module or processor MT_CO2 represented in FIG. 2B.

In the course of step C114a), there is furthermore undertaken, in the course of a sub-step C1142a) represented in FIG. 1B, a quantization of the data of the transformed block $BSt_u$, to produce a quantized block $BSq_u$ made up of quantized coefficients. Such a quantization step is for example of scalar or vector type.

Sub-step C1142a) is performed by means of the quantization software module or processor MQ_CO2 such as represented in FIG. 2B.

In a manner known per se, in the course of step C114a), there is furthermore undertaken, in the course of a sub-step C1143a) represented in FIG. 1B, the coding of the quantized coefficients of the block $BSq_u$. Such a coding is for example an entropy coding of CABAC type ("Context Adaptive Binary Arithmetic Coding") or else an entropy coding of arithmetic or Huffman type.

Sub-step C1143a) is implemented by the coding software module or processor MC_CO2 represented in FIG. 2B.

In the course of a step C115a) represented in FIG. 1B, there is undertaken the construction of the data signal or stream F2 which contains:
- the coded data on completion of aforementioned step C114a),
- the index $IV_{opt}$ of the optimal quantization vector $V_{opt}$ determined in aforementioned step C112a).

Step C115a) is implemented by a data signal construction software module or processor MCF2, such as represented in FIG. 2B, which is driven by the microprocessor µP of the processing unit UT_CO2.

The data signal F2 is thereafter transmitted by a communication network (not represented) to a remote terminal. The latter comprises the decoder DO2 represented in FIG. 3B.

In a manner known per se, the data signal F2 furthermore comprises certain information encoded by the coder CO2, such as the first type of prediction (Inter or Intra) applied in step C3, and if appropriate, the prediction mode selected, the index of the predictor block obtained $BP_{opt}$ obtained on completion of step C3, denoted $IBP_{opt}$, the type of partitioning of the current block $B_u$ if the latter has been partitioned, the reference image index and the displacement vector which are used in the Inter mode of prediction.

In a manner known per se, there is thereafter undertaken the decoding of the residual block $BSr_u$. A decoded residual block $BSDr_u$ is then obtained. There is then undertaken the construction of the decoded block $BD_u$ by adding to the predicted block $BP_{opt}$ the decoded residual block $BSDr_u$.

It should be noted that the decoded block $BD_u$ is the same as the decoded block obtained on completion of the method for decoding the image $IC_j$ which will be described further on in the description. The decoded block $BD_u$ is thus rendered available to be used by the coder CO2 of FIG. 2B.

In the course of a step C116a) represented in FIG. 1B, in accordance with the second embodiment of the invention, there is undertaken a test which consists in verifying whether a criterion for updating the dictionaries $CBK_1$, $CBK_2$, ..., $CBK_W$ is fulfilled or not.

According to a first variant, such a criterion consists in comparing the number of non-zero coefficients in the residual block $BSr_u$ with a predetermined threshold. For example, the updating criterion is considered to be fulfilled if the number of non-zero coefficients is greater than 3.

According to a second variant, such a criterion consists in comparing the bitrate of the coding of the residual block $BSr_u$ with a predetermined threshold. For example, the updating criterion is considered to be fulfilled if the bitrate of the coding of the residual block $BSr_u$ is greater than 10 bits.

Step C116a) is implemented by a calculation software module or processor CAL7_CO2 such as represented in FIG. 2B, which is driven by the microprocessor µP of the processing unit UT_CO2.

If the updating criterion is fulfilled, in the course of a step C117a) represented in FIG. 1B, there is undertaken an updating of at least one of the dictionaries $CBK_1$, $CBK_2$, ..., $CBK_W$.

Step C117a) is implemented by a calculation software module or processor CAL8_CO2 such as represented in FIG. 2B, which is driven by the microprocessor µP of the processing unit UT_CO2.

According to a first variant, step C117a) consists in re-updating the set of current dictionaries $CBK_1$, $CBK_2$, ..., $CBK_W$.

According to a second preferred variant, only an updating of the dictionary $CBK_{opt}$ is undertaken.

In the preferred embodiment, the dictionary $CBK_{opt}$ is updated in the following manner.

The vector $V_{opt}$, as well as its neighbors contained in the dictionary $CBK_{opt}$, are firstly considered. The neighbors are denoted $V_{opt-R}$, $V_{opt-R+1}$, $V_{opt-R+2}$, ..., $V_{opt-1}$, $V_{opt}$, $V_{opt+1}$, ..., $V_{opt+R-2}$, $V_{opt+R-1}$, $V_{opt+R}$.

The parameter R which defines the number of following and preceding neighbors of the vector $V_{opt}$ is predetermined, for example at the value 5. According to this configuration, the 5 neighbor vectors which succeed and precede the vector $V_{opt}$ are considered.

Next, vectors $W_{opt+n}$, n belonging to $<-R,+R>$, are constructed with a view to the updating, in the following manner:

$$W_{opt+n} = V_{opt+n} + \text{alpha} * f(n) * ((V_{opt} + BSr_u) - V_{opt+n})$$

where:
- alpha is a predetermined parameter, for example equal to 0.1,
- and f(n) is a value which depends on the distance between the index n and the index opt.

For example, in the preferred embodiment:

$$f(n) = 0.2 * (5-n)/5$$

The vectors $W_{opt+n}$ with n ranging from −5 to +5 are therefore calculated, and will replace respectively the vectors $V_{opt+n}$ in the dictionary $CBK_{opt}$.

The set of current dictionaries $CBK_1$, $CBK_2$, ..., $CBK_W$ is therefore thus re-updated.

In an alternative embodiment, the parameters of the updating can be different according to the size of the image. Indeed, if the image is small, a fast learning of the statistics of the current image $IC_j$ is necessary.

For example:
- for an image size belonging to a single-definition SD video (the abbreviation standing for "Standard Definition"), i.e. fewer than 720 pixels high and fewer than 1280 pixels wide, a parameter alpha equal to 0.3 is adopted;
- for an image size belonging to a High-Definition HD video, i.e. between 720 and 1080 pixels high and between 1280 and 1920 pixels wide, or much greater than 1280×1920 pixels, a parameter alpha equal to 0.2 is adopted;
- for an image size greater than the size of an HD image, a parameter equal to 0.1 is adopted.

It is of course possible to re-update the dictionaries in other ways. For example, it is possible to apply the same type of quantization vector updating as in the preferred mode. However, the updating, instead of being applied to the neighbor vectors of the quantization vector $V_{opt}$ in the dictionary $CBK_{opt}$, is applied to the vectors close to $V_{opt}$+$BSDr_u$ in the sense of the distortion. As a variant, the updating is applied to vectors close to $V_{opt}$+$BSDr_u$ not only in the dictionary $CBK_{opt}$ but in the set of current dictionaries $CBK_1$, $CBK_2$, ..., $CBK_W$.

Subsequent to aforementioned step C117a), there is undertaken, in the course of a step C118a) represented in FIG. 1B, the selection of the following block of the current image $IC_j$. Next, the block coding steps described hereinabove are again implemented for this following block.

If on completion of aforementioned step C116a), the updating criterion is not fulfilled, there is undertaken, in the course of aforementioned step C118a), the selection of the following block of the current image $IC_j$. Next, the block coding steps described hereinabove are again implemented for this following block.

In the course of a step C119a) represented in FIG. 1B, the coder CO2 of FIG. 2B tests whether the current block which has been coded in accordance with the coding method described hereinabove is the last block of the current image $IC_j$.

If such is not the case, aforementioned step C118a) is implemented.

If the current block is the last block of the current image $IC_j$, in the course of a step C120a) represented in FIG. 1B, the coder CO2 of FIG. 2B tests whether or not the following current image $IC_{j+1}$ is an image of Intra type.

In the case where the following current image $IC_{j+1}$ is of Intra type, before undertaking the coding of the blocks of this image in accordance with the coding method according to the invention, step C117a) of updating the dictionaries is implemented.

In the example represented, the quantization vectors of the dictionary $CBK_{opt}$ are each initialized to a predetermined respective value.

In the case where the following current image $IC_{j+1}$ is not of Intra type, the coding of the blocks of this image is directly undertaken in accordance with the coding method of FIG. 1A and the coding by vector quantization of FIGS. 1B and 1C is optionally undertaken.

FIG. 1C describes more precisely how the vector quantization is implemented when it has been verified, on completion of step C4 of FIG. 1A, that the first type of prediction is Inter.

In the same manner as in the first embodiment, there is undertaken the calculation of a residual block $Br_u$. Such a step being identical to step C5b) of FIG. 1A, it will not be described again.

Subsequent to the calculation of the residual block $Br_u$, in the course of a step C110b) represented in FIG. 1C, there is undertaken the selection of an optimal mode of prediction $MP'_{opt}$ which represents the mode of prediction of a second type selected according to the invention. Such a step being in every respect identical to step C6b) of FIG. 1A, it will not be described again in detail.

Step C110b) is implemented by a calculation software module or processor CAL3_CO2 such as represented in FIG. 2B, which is driven by the microprocessor µP of the processing unit UT_CO2.

In the course of a step C111b) represented in FIG. 1C, there is undertaken the selection of a dictionary of quantization vectors $CBK_{opt}$ which belongs to one or more dictionaries of quantization vectors available to the coder, denoted $CBK_1, CBK_2, \ldots, CBK_W$. Such dictionaries are stored beforehand in the buffer memory TAMP_CO2 of the coder CO2, such as represented in FIG. 2B.

In accordance with the second embodiment of the invention, the dictionary $CBK_{opt}$ selected is that which is associated with the optimal prediction mode $MP'_{opt}$ which was selected in step C110b).

Step C111b) is implemented by a calculation software module or processor CAL4_CO2 such as represented in FIG. 2B, which is driven by the microprocessor µP of the processing unit UT_CO2.

In the course of a step C112b) represented in FIG. 1C, there is undertaken a selection of one of the quantization vectors of the dictionary $CBK_{opt}$ which was selected in step C111b).

Such a step being identical to step C111a) of FIG. 1B, it will not be described again in detail.

On completion of step C112b), an optimal quantization vector $V_{opt}$ is obtained.

The optimal quantization vector $V_{opt}$ is considered to be an approximation of the residual block $Br_u$. The information relating to this prediction is intended to be written into the aforementioned data signal F2.

Step C112b) is implemented by the calculation software module or processor CAL5_CO2 of FIG. 2B.

In the course of a step C113b) represented in FIG. 1C, there is undertaken a coding of the quantization vector $V_{opt}$ selected on completion of step C112b). Such a step being identical to step C112a) of FIG. 1B, it will not be described again in detail. On completion of step C113b), the index $IV_{opt}$ of the quantization vector $V_{opt}$ is obtained.

Step C113b) is implemented by the binary coding software module or processor CB_CO2 such as represented in FIG. 2B.

In the course of a step C114b) represented in FIG. 1C, there is undertaken the comparison of the data relating to the residual block $Br_u$ with the data of the vector $V_{opt}$. More precisely, in the course of this step, there is undertaken the calculation of the difference between the residual block $Br_u$ and the vector $V_{opt}$.

A second set of data, called a secondary residual block $BSr_u$, is then obtained on completion of step C114b).

Step C114b) is implemented by the software module or processor CAL6_CO2 of FIG. 2B.

In the course of a step C115b) represented in FIG. 1C, there is undertaken, in accordance with the invention, a coding of the data of the secondary residual block $BSr_u$.

In the course of step C115b), there is undertaken, in the course of a sub-step C1151b), a transformation of the secondary residual block $BSr_u$ according to a conventional direct transformation operation, to produce a transformed block $BSt_u$.

Sub-step C1151b) is implemented by the software module or processor MT_CO2 of FIG. 2B.

In the course of step C115b), there is furthermore undertaken, in the course of a sub-step C1152b) represented in FIG. 1C, a quantization of the data of the transformed block $BSt_u$, to produce a quantized block $BSq_u$ made up of quantized coefficients. Such a quantization step is for example of scalar or vector type.

Sub-step C1152b) is performed by means of the quantization software module or processor MQ_CO2 of FIG. 2B.

In a manner known per se, in the course of step C115b), there is furthermore undertaken, in the course of a sub-step C1153b) represented in FIG. 1C, the coding of the quantized coefficients of the block $BSq_u$. Such a coding is for example an entropy coding of CABAC type ("Context Adaptive Binary Arithmetic Coding") or else an entropy coding of arithmetic or Huffman type.

Sub-step C1153b) is implemented by the coding software module or processor MC_CO2 of FIG. 2B.

In the course of a step C116b) represented in FIG. 1C, there is undertaken the construction of the data signal or stream F2 which contains:
- the coded data on completion of aforementioned step C115b),
- the index $IV_{opt}$ of the optimal quantization vector $V_{opt}$ determined in aforementioned step C113b).

Step C116b) is implemented by the software module or processor MCF2 of FIG. 2B.

The data signal F2 is thereafter transmitted by a communication network (not represented) to a remote terminal. The latter comprises the decoder DO2 represented in FIG. 3B.

In a manner known per se, the data signal F2 furthermore comprises certain information encoded by the coder CO2, such as the first type of prediction (Inter or Intra) applied in step C3, and if appropriate, the prediction mode selected, the index of the predictor block obtained $BP_{opt}$ obtained on completion of step C3, denoted $IBP_{opt}$, the type of partitioning of the current block $B_u$ if the latter has been partitioned, the reference image index and the displacement vector which are used in the Inter mode of prediction.

In a manner known per se, there is thereafter undertaken the decoding of the residual block $BSr_u$. A decoded residual block $BSDr_u$ is then obtained. There is then undertaken the construction of the decoded block $BD_u$ by adding to the predicted block $BP_{opt}$ the decoded residual block $BSDr_u$.

It should be noted that the decoded block $BD_u$ is the same as the decoded block obtained on completion of the method for decoding the image $IC_j$ which will be described further on in the description. The decoded block $BD_u$ is thus rendered available to be used by the coder CO2 of FIG. 2B.

In the course of a step C117b) represented in FIG. 1C, in accordance with the second embodiment of the invention, there is undertaken a test which consists in verifying whether a criterion for updating the dictionaries $CBK_1$, $CBK_2$, ..., $CBK_W$ is fulfilled or not.

Such a step being identical to step C116a) of FIG. 1B, it will not be described again in detail.

Step C117b) is implemented by the calculation software module or processor CAL7_CO2 of FIG. 2B.

If the updating criterion is fulfilled, in the course of a step C118b) represented in FIG. 1C, there is undertaken an updating of at least one of the dictionaries $CBK_1$, $CBK_2$, ..., $CBK_W$.

Step C118b) is implemented by the calculation software module or processor CAL8_CO2 of FIG. 2B.

Such a step being identical to step C117a) of FIG. 1B, it will not be described again in detail.

Subsequent to aforementioned step C118b), there is undertaken, in the course of a step C119b) represented in FIG. 1C, the selection of the following block of the current image $IC_j$. Next, the block coding steps described hereinabove are again implemented for this following block.

If on completion of aforementioned step C117b), the updating criterion is not fulfilled, there is undertaken, in the course of aforementioned step C118b), the selection of the following block of the current image $IC_j$. Next, the block coding steps described hereinabove are again implemented for this following block.

In the course of a step C120b) represented in FIG. 1C, the coder CO2 of FIG. 2B tests whether the current block which has been coded in accordance with the coding method described hereinabove is the last block of the current image $IC_j$.

If such is not the case, aforementioned step C119b) is implemented.

If the current block is the last block of the current image $IC_j$, in the course of a step C121b) represented in FIG. 1C, the coder CO2 of FIG. 2B tests whether or not the following current image $IC_{j+1}$ is an image of Intra type.

In the case where the following current image $IC_{j+1}$ is of Intra type, before undertaking the coding of the blocks of this image in accordance with the coding method according to the invention, step C118b) of updating the dictionaries is implemented.

In the example represented, the quantization vectors of the dictionary $CBK_{opt}$ are each initialized to a predetermined respective value.

In the case where the following current image $IC_{j+1}$ is not of Intra type, the coding of the blocks of this image is directly undertaken in accordance with the coding method of FIG. 1A and the coding by vector quantization of FIGS. 1B and 1C is optionally undertaken.

Detailed Description of the Decoding Part

A first embodiment of the invention will now be described, in which the decoding method according to the invention is used to decode a data signal or stream representative of an image or of a sequence of images which is able to be decoded by a decoder in accordance with any one of the current or forthcoming video decoding standards.

In this first embodiment, the decoding method according to the invention is for example implemented in a software or hardware manner by modifications of such a decoder.

Figure 4A:
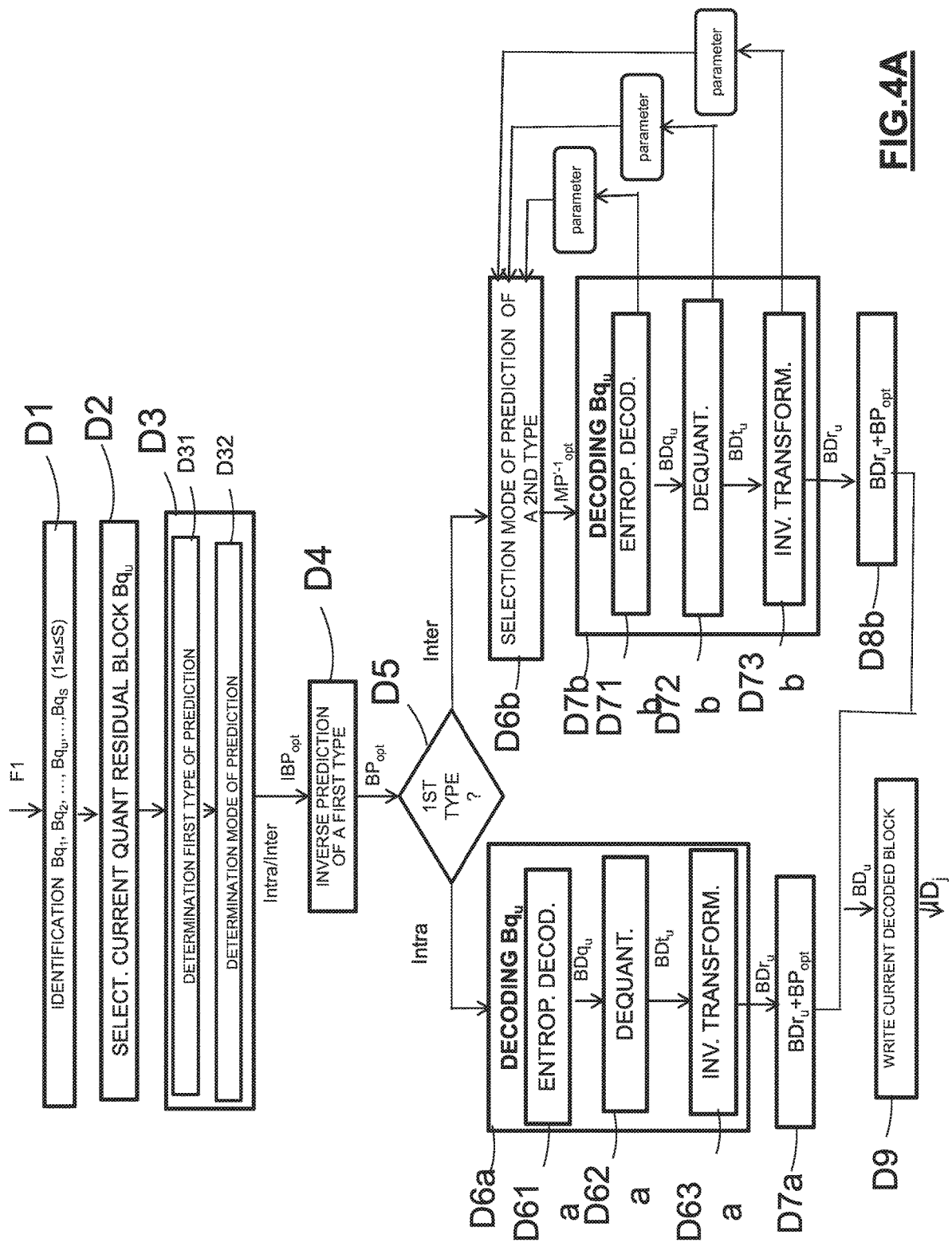
FIG. 4A represents the steps of the decoding method according to a first embodiment of the invention.

The decoding method according to the invention is represented in the form of an algorithm comprising steps D1 to D9 such as represented in FIG. 4A.

Figure 3A:
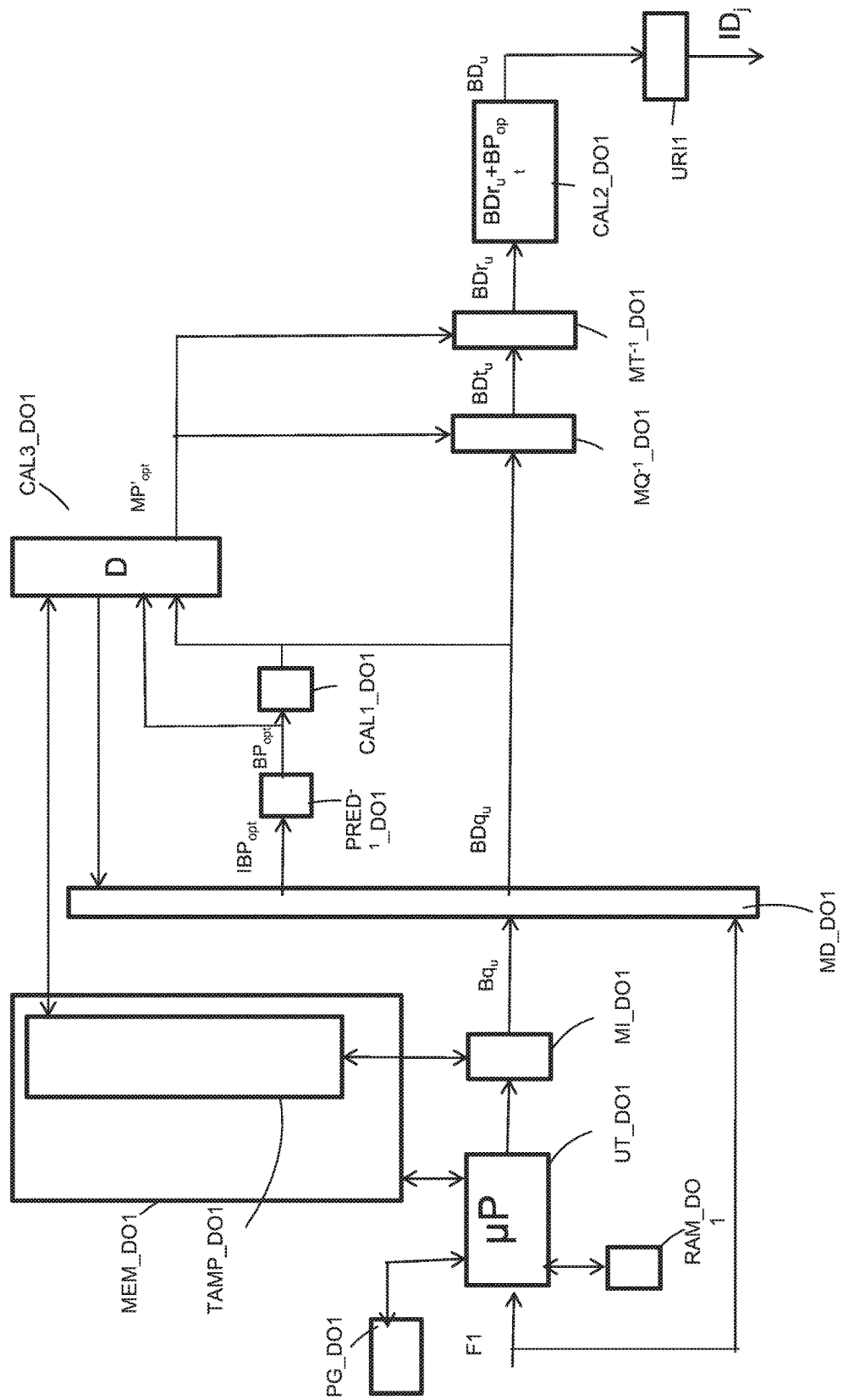
FIG. 3A represents a decoding device according to a first embodiment of the invention.
Figure 3:
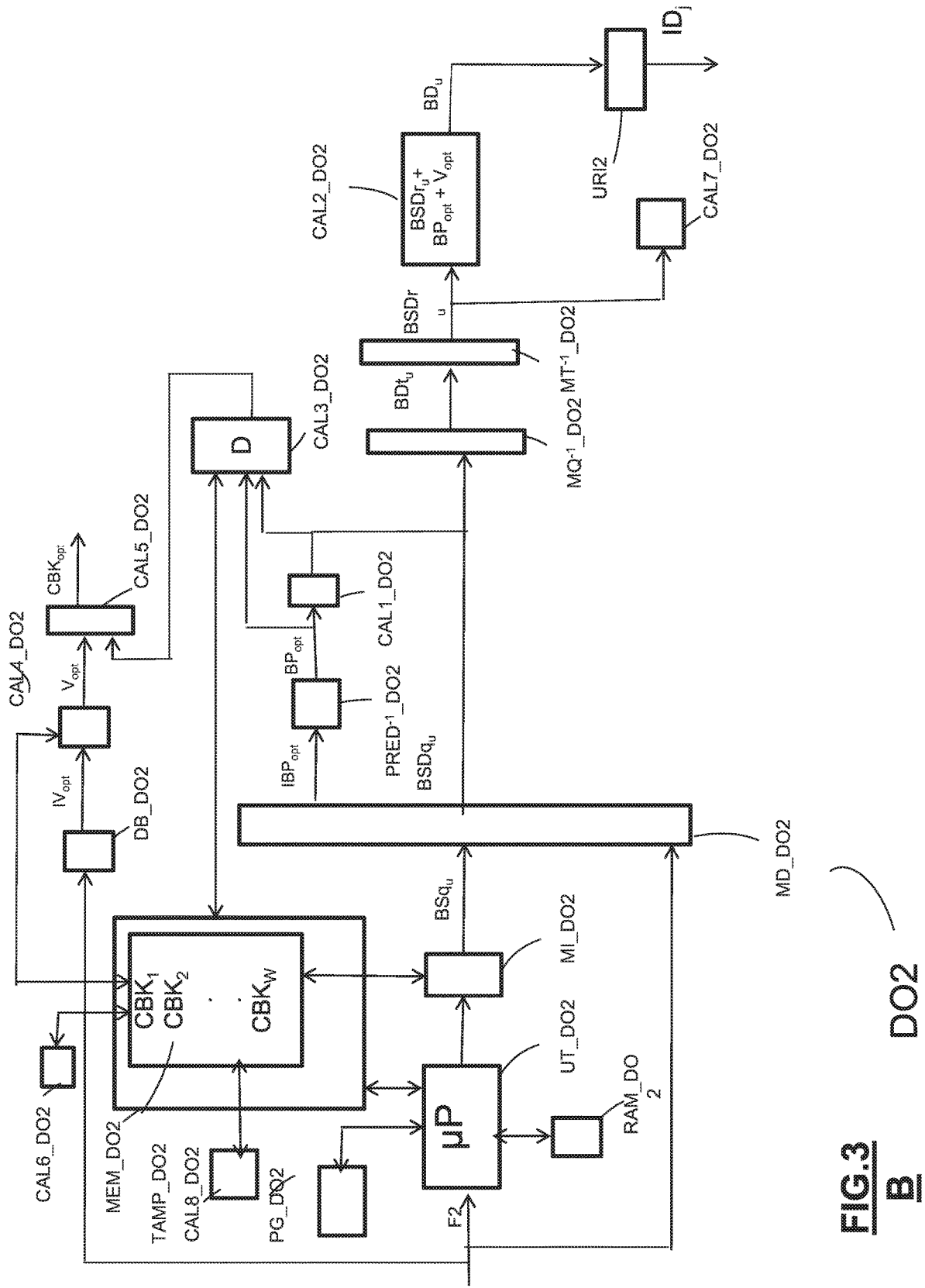
FIG. 3B represents a decoding device according to a second embodiment of the invention.

According to this first embodiment, the decoding method according to the invention is implemented in a decoding device or decoder DO1 represented in FIG. 3A.

As illustrated in FIG. 3A, according to this first embodiment of the invention, the decoder DO1 comprises a memory MEM_DO1 which itself comprises a buffer memory TAMP_DO1, a processing unit UT_DO1 equipped for example with a microprocessor μP and driven by a computer program PG_DO1 which implements the decoding method according to the invention. On initialization, the code instructions of the computer program PG_DO1 are for example loaded into a RAM memory denoted RAM_DO1, before being executed by the processor of the processing unit UT_DO1.

The decoding method represented in FIG. 4A applies to a data signal or stream representative of a current image $IC_j$ to be decoded which is fixed or which belongs to a sequence of images to be decoded.

For this purpose, information representative of the current image $IC_j$ to be decoded is identified in the data signal F1 received at the decoder DO1 and such as delivered on completion of the coding method of FIG. 1A.

With reference to FIG. 4A, in the course of a step D1, there is undertaken the identification in the signal F1 of the quantized residual blocks $Bq_1$, $Bq_2$, ..., $Bq_u$, $Bq_S$ ($1 \leq u \leq S$) associated respectively with the blocks $B_1$, $B_2$, ..., $B_u$, ..., $B_S$ previously coded in accordance with the aforementioned lexicographic order, according to the coding alternative implemented in step C6a) or C7b) of FIG. 1A.

Such an identification step is implemented by a stream analysis identification software module or processor MI_DO1, such as represented in FIG. 3A, said module being driven by the microprocessor μP of the processing unit UT_DO1.

Other types of traversal than that which has just been described hereinabove are of course possible and depend on the order of traversal chosen on coding.

In the example represented, the blocks $B_1$, $B_2$, ..., $B_u$, ..., $B_S$ to be decoded have a square shape and all contain K pixels, with K≥1. According to a preferred embodiment, said blocks to be decoded are 4×4 or 8×8 pixels in size.

As a function of the size of the image which is not necessarily a multiple of the size of the blocks, the last blocks on the left and the last blocks at the bottom might not be square. In an alternative embodiment, the blocks may be for example of rectangular size and/or not aligned with one another.

Each block to be decoded can moreover be itself divided into sub-blocks which are themselves subdividable.

In the course of a step D2 represented in FIG. 4A, the decoder DO1 of FIG. 3A selects as current block the first quantized block $Bq_u$ which contains quantized data which have been coded in the course of sub-step C63a) or C73b) of FIG. 1A.

In the course of a step D3 represented in FIG. 4A, there is undertaken a decoding of the information relating to the first type of prediction of the current block $B_u$ such as implemented on coding in the course of step C3 of FIG. 1A, and which have been written into the data signal F1. For this purpose, step D3 comprises:
- a sub-step D31 of determining a first type of prediction of the current block, for example Intra or Inter,
- a sub-step D32 of determining a mode of prediction associated with the first type of prediction determined.

In the case where the first type of prediction determined is Intra, the mode of prediction determined comprises at least one prediction parameter which is a direction of prediction selected from among a set of predetermined directions of prediction (for example 35 directions in the HEVC standard).

In the case where the first type of prediction determined is Inter, the mode of prediction comprises at least the following two prediction parameters:
- the index of the motion vector which describes the motion between the pixels of the current block and the pixels of a block which has already been decoded and which belongs to an image other than the current image,
- the index of this other image.

According to a preferred embodiment:
- it is the first type of Inter prediction applied in step C3 which is determined in the data signal F1 in the course of sub-step D31,
- it is the index of the motion vector and the index of the reference image used during this Inter prediction which are determined in the data signal F1 in the course of sub-step D32.

In the course of step D3 is also determined in the data signal F1 the index of the predictor block obtained $BP_{opt}$ obtained on completion of step C3, denoted $IBP_{opt}$, and the type of partitioning of the current block $B_u$ if the latter has been partitioned.

Such a decoding step D3 is implemented by the decoding module MD_DO1 represented in FIG. 3A.

In the course of a step D4 represented in FIG. 4A, there is undertaken the predictive decoding of the current block to be decoded with the aid of the index of the predictor block $BP_{opt}$ which has been decoded in the course of the aforementioned step D3. For this purpose, in a manner known per se, there is undertaken, in association with the decoded index of the predictor block $BP_{opt}$, the selection, in the buffer memory TAMP_DO1 of the decoder DO1 of FIG. 3A, of the corresponding predictor block $BP_{opt}$ which figures among a plurality of candidate predictor blocks stored beforehand in the buffer memory TAMP_DO1. Each of the candidate predictor blocks is a block of pixels which has already been decoded.

Step D4 is implemented by an inverse prediction software module or processor $PRED^{-1}\_DO1$, such as represented in FIG. 3A, which is driven by the microprocessor µP of the processing unit UT_DO1.

In the course of a step D5 represented in FIG. 4A, in accordance with the invention, there is undertaken a verification of the first type of prediction applied to the current block $B_u$ during step C3.

Step D5 is implemented by a calculation software module or processor CAL1_DO1 represented in FIG. 3A, which is driven by the microprocessor µP of the processing unit UT_DO1.

In the case where the first type of prediction applied to the coding is Intra, in the course of a step D6a) represented in FIG. 4A, there is conventionally undertaken a decoding of the data of the quantized residual block $Bq_u$.

In a manner known per se, in the course of step D6a), there is undertaken, in the course of a sub-step D61a), a decoding of the current set of quantized coefficients $Bq_u$.

Such a decoding is for example an entropy decoding of CABAC type or else an entropy decoding of arithmetic or Huffman type.

On completion of aforementioned sub-step D61a), a set $BDq_u$ of digital information associated with the current set of quantized coefficients $Bq_u$ is obtained.

Such a decoding sub-step D61a) is implemented by the entropy decoding module MD_DO1 represented in FIG. 3A.

In a manner known per se, in the course of step D6a), there is furthermore undertaken, in the course of a sub-step D62a) represented in FIG. 4A, a dequantization of the digital information obtained subsequent to sub-step D61a), according to a conventional dequantization operation which is the operation inverse to the quantization implemented during the quantization sub-step C62a) of FIG. 1A. A current set of dequantized coefficients $BDt_u$ is then obtained on completion of sub-step D62a). Such a dequantization step is for example of scalar or vector type.

Sub-step D62a) is performed by means of an inverse quantization software module or processor $MQ^{-1}\_DO1$ such as represented in FIG. 3A, which module is driven by the microprocessor µP of the processing unit UT_DO1.

In a manner known per se, in the course of step D6a), there is furthermore undertaken, in the course of a sub-step D63a) represented in FIG. 4A, a transformation of the current set of dequantized coefficients $BDt_u$, such a transformation being an inverse direct transformation. This transformation is the operation inverse to the transformation performed in sub-step C61a) of FIG. 1A. On completion of sub-step D63a), a current decoded residual block $BDr_u$ is obtained.

Sub-step D63a) is implemented by an inverse transformation software module or processor $MT^{-1}\_DO1$ such as represented in FIG. 3A, which is driven by the microprocessor µP of the processing unit UT_DO1.

The processor $MT^{-1}\_DO1$ is able to implement an inverse direct transformation such as for example an inverse discrete cosine transformation of $DCT^{-1}$ type, an inverse discrete sine transformation of $DST^{-1}$ type, an inverse discrete wavelet transformation of $DWT^{-1}$ type.

In the course of a step D7a) represented in FIG. 4A, there is undertaken the reconstruction of the current block $B_u$ by adding to the decoded residual block $BDr_u$, obtained on completion of sub-step D63a), the predictor block $BP_{opt}$ which was obtained on completion of the aforementioned step D4. On completion of step D7a), a current decoded block $BD_u$ is obtained.

Step D7a) is implemented by a software module or processor CAL2_DO1 represented in FIG. 3A, which is driven by the microprocessor μP of the processing unit UT_DO1.

In the case where the first type of prediction which was applied to the coding is Inter, in accordance with the invention, there is undertaken, in the course of a step D6b) represented in FIG. 4A, the selection of an inverse prediction mode associated with an inverse prediction of a second type, different from said aforementioned first type of inverse prediction. According to a preferred embodiment, the inverse prediction of the second type is an Intra prediction which is, in a manner known per se, associated with a plurality of modes of prediction each defined by a predetermined direction of prediction. In the case of the Intra prediction for example proposed in the HEVC standard, there exist thirty-five possible directions of prediction, thus amounting to determining thirty-five candidate predictor blocks available for the prediction of the current block $B_u$. According to the invention, step D6b) consists in selecting from among the available candidate predictor blocks, the candidate predictor which minimizes the distortion between the optimal predictor block $BP_{opt}$ which was obtained on completion of the aforementioned inverse prediction step D4 of a first type and each of said available candidate predictor blocks. In the same manner as in the case of the aforementioned inverse prediction of the first type, each of the candidate predictor blocks set into competition in the course of step D6b) is a block of pixels which has already been decoded. Such predictor blocks are stored beforehand in the buffer memory TAMP_DO1 of the decoder DO1, such as represented in FIG. 3A.

On completion of step D6b), an optimal predictor block $BP'_{opt}$ is obtained. Such an optimal predictor block $BP'_{opt}$ is then associated with its optimal inverse prediction mode $MP'^{-1}_{opt}$ which represents the inverse prediction mode of a second type selected according to the invention.

Step D6b) is implemented by a calculation software module or processor CAL3_DO1 such as represented in FIG. 3A, which is driven by the microprocessor μP of the processing unit UT_DO1.

In the course of a step D7b) represented in FIG. 4A, in accordance with the invention, there is undertaken a decoding of the data of the quantized residual block $Bq_u$ with the aid of at least one decoding parameter determined on the basis of the inverse prediction mode selected in step D6b).

In the course of step D7b), there is undertaken, in the course of a sub-step D71b) represented in FIG. 4A, a decoding of the current set of quantized coefficients $Bq_u$.

Such a decoding is for example an entropy decoding of CABAC type or else an entropy decoding of arithmetic or Huffman type.

On completion of aforementioned sub-step D71b), a set $BDq_u$ of digital information associated with the current set of quantized coefficients $Bq_u$ is obtained.

According to one embodiment of the invention, the entropy decoding operation D71b) is chosen as being a decoding operation specific to the inverse prediction mode selected in step D6b). Stated otherwise, the probabilities used for the decoding of the coefficients of the block $Bq_u$ depend on the prediction mode selected in step D6b). For example, if the Intra inverse prediction mode selected makes it possible to obtain a decoded residual block $BDr_u$ of low amplitude, the probability of occurrence of low-amplitude coefficients is increased. Conversely, if the Intra inverse prediction mode selected makes it possible to obtain a decoded residual block $BDr_u$ of high amplitude, the probability of occurrence of low-amplitude coefficients is decreased.

Such a decoding sub-step D71b) is implemented by the entropy decoding module MD_DO1 represented in FIG. 3A.

In the course of step D7b), there is undertaken, in the course of a sub-step D72b) represented in FIG. 4A, a dequantization of the digital information obtained subsequent to sub-step D71b), according to a conventional dequantization operation which is the operation inverse to the quantization implemented during the quantization sub-step C72b) of FIG. 1A. A current set of dequantized coefficients $BDt_u$ is then obtained on completion of sub-step D72b). Such a dequantization step is for example of scalar or vector type.

According to one embodiment of the invention, alternatively to the entropy decoding performed in sub-step D71b) or in combination with this entropy decoding, the dequantization operation is chosen as being a dequantization specific to the prediction mode selected in step D6b). According to a first example, if the Intra inverse prediction mode selected is mode 0, 1 or 26 of the HEVC standard, it is the inverse quantization step specific to the HEVC standard which is chosen as being the most suited to this mode. According to a second example, if the Intra inverse prediction mode selected is one of modes 2 to 25, 27 to 34 of the HEVC standard, the inverse quantization step most suited to this mode is double the inverse quantization step specific to the HEVC standard. Such a provision makes it possible to adapt the dequantization to suit the specific energy of the decoded block $BD_u$ calculated on the basis of the predictor block $BP_{opt}$ obtained in step D4.

Sub-step D72b) is performed by means of the quantization software module or processor $MQ^{-1}$_DO1 represented in FIG. 3A.

In the course of step D7b), there is undertaken, in the course of a sub-step D73b) represented in FIG. 4A, a transformation of the current set of dequantized coefficients $BDt_u$, such a transformation being an inverse direct transformation. This transformation is the operation inverse to the transformation performed in sub-step C71b) of FIG. 1A. On completion of sub-step D73b), a current decoded residual block $BDr_u$ is obtained.

Sub-step D73b) is implemented by the inverse transformation software module or processor $MT^{-1}$_DO1, such as represented in FIG. 3A.

According to one embodiment of the invention, alternatively to the selection of the entropy decoding performed in sub-step D71b) and/or to the selection of the inverse quantization performed in sub-step D72b), or else in combination with one and/or the other of these selections, the direct inverse transformation operation is chosen as being an inverse transformation specific to the mode of prediction of a second type selected in step D6b). According to a first example, if the Intra inverse prediction mode selected is mode 0 or 1 of the HEVC standard, the inverse direct transformation most suited to this mode being the $DST^{-1}$ transformation, it is the latter which is chosen. According to a second example, if the Intra inverse prediction mode selected is one of modes 2 to 34 of the HEVC standard, the inverse direct transformation most suited to this mode being the $DCT^{-1}$ transformation, it is the latter which is chosen.

In the course of a step D8b) represented in FIG. 4A, there is undertaken the reconstruction of the current block $B_u$ by adding to the decoded residual block $BDr_u$ obtained on completion of sub-step D73b), the predictor block $BP_{opt}$ which was obtained on completion of the aforementioned step D4. On completion of step D8b), a current decoded block $BD_u$ is obtained.

Step D8b) is implemented by the software module or processor CAL2_DO1 represented in FIG. 3A.

In the course of a step D9 represented in FIG. 4A, said decoded block $BD_u$ is written in a decoded image $ID_j$.

Such a step is implemented by an image reconstruction software module or processor URI1 such as represented in FIG. 3A, said module being driven by the microprocessor μP of the processing module UT_DO1.

The decoding steps which have just been described hereinabove are implemented for all the blocks $B_1$, $B_2$, ..., $B_u$, ..., $B_S$ to be decoded of the current image $IC_j$ considered, in a predetermined order which is for example the lexicographic order.

A second embodiment of the invention will now be described with reference to FIGS. 3B, 4B and 4C.

In this second embodiment, each block to be decoded is subjected to a decoding by scalar quantization, as was described with reference to FIG. 3A, which is advantageously combined with a decoding by vector quantization.

According to the second embodiment, the decoding method according to the invention is implemented in a decoding device or decoder DO2 represented in FIG. 3B. As illustrated in FIG. 3B, such a decoding device comprises a memory MEM_DO2 comprising a buffer memory TAMP_DO2, a processing unit UT_DO2 equipped for example with a microprocessor μP and driven by a computer program PG_DO2 which implements the decoding method according to the invention. On initialization, the code instructions of the computer program PG_DO2 are for example loaded into a RAM memory, denoted RAM_DO2, before being executed by the processor of the processing unit UT_DO2.

Furthermore, the decoder DO2 comprises software modules or processors MI_DO2, $PRED^{-1}$_DO2, CAL1_DO2, CAL3_DO2, which are respectively identical to the software modules or processors MI_DO1, $PRED^{-1}$_DO1, CAL1_DO1, CAL3_DO1 of the decoder DO1 represented in FIG. 3A. For this reason, the software modules or processors MI_DO2, $PRED^{-1}$_DO2, CAL1_DO2, CAL3_DO2 will not be described again in detail.

FIG. 4B describes more precisely how the vector inverse quantization is implemented when it has been verified, on completion of step D5 of FIG. 4A, that the first type of inverse prediction is Intra.

With reference to FIG. 4B, in the course of a step D110a), there is undertaken a decoding of the index $IV_{opt}$ of the optimal quantization vector $V_{opt}$ which was selected on completion of step C611a) of FIG. 1B.

Such a decoding step D110a) is implemented by the decoding module DB_DO2 of FIG. 3B.

In the course of a step D111a) represented in FIG. 4B, there is undertaken the determination of the optimal quantization vector $V_{opt}$ associated with the decoded index $IV_{opt}$.

Step D111a) is implemented by a calculation software module or processor CAL4_DO2 such as represented in FIG. 3B, which is driven by the microprocessor μP of the processing unit UT_DO2.

In the course of a step D112a) represented in FIG. 4B, there is undertaken the selection of a dictionary of quantization vectors, denoted $CBK_{opt}$, which contains the quantization vector $V_{opt}$ determined in step D111a). Such a dictionary belongs to a plurality of available dictionaries of quantization vectors, denoted $CBK_1$, $CBK_2$, ..., $CBK_W$.

Such dictionaries are stored beforehand in the buffer memory TAMP_DO2 of the decoder DO2, such as represented in FIG. 3B.

Step D112a) is implemented by a calculation software module or processor CAL5_DO2 such as represented in FIG. 3B, which is driven by the microprocessor μP of the processing unit UT_DO2.

In accordance with the invention, in a manner corresponding to the coding step C110a) of FIG. 1B, such a selection is implemented as a function of one and/or of the other of the following elements:
  the characteristics of the prediction (for example, the Intra mode chosen from among the 35 Intra modes of the HEVC standard), whose indices have been decoded in step D3,
  the frequency characteristics of the predictor block $BP_{opt}$ whose index $IB_{opt}$ has been decoded in step D3,
  the size of the current block $B_u$ to be decoded,
  characteristics of the current image $IC_j$ to be decoded, such as its size or its energy.

In the preferred embodiment, W=70, that is to say that:
  in the case of a current block $B_u$ of size 4×4, there exists a different dictionary for each of the 35 Intra modes considered in the HEVC standard,
  in the case of a current block $B_u$ of size 8×8, there exists a different dictionary for each of the 35 Intra modes considered in the HEVC standard.

In accordance with this preferred embodiment, the dictionary selected therefore depends both on the size of the current block $B_u$ to be decoded and on the mode of prediction whose index has been decoded in step D3.

In the course of a step D113a) represented in FIG. 4B, there is undertaken, in accordance with the second embodiment of the invention, a decoding of the data of the quantized residual block $BSq_u$.

In the course of step D113a), there is undertaken, in the course of a sub-step D1131a) represented in FIG. 4B, a decoding of the current set of quantized coefficients $BSq_u$.

Such a decoding is for example an entropy decoding of CABAC type or else an entropy decoding of arithmetic or Huffman type.

On completion of aforementioned sub-step D1131a), a set $BSDq_u$ of digital information associated with the current set of quantized coefficients $BSq_u$ is obtained.

Such a decoding sub-step D1131a) is implemented by an entropy decoding module MD_DO2 represented in FIG. 3B, which is driven by the microprocessor μP of the processing unit UT_DO2.

In the course of step D113a), there is undertaken, in the course of a sub-step D1132a) represented in FIG. 4B, a dequantization of the digital information obtained subsequent to sub-step D1131a), according to a conventional dequantization operation which is the operation inverse to the quantization implemented during the quantization sub-step C1142a) of FIG. 1B. A current set of dequantized coefficients $BSDt_u$ is then obtained on completion of sub-step D1132a). Such a dequantization sub-step is for example of scalar or vector type.

Sub-step D1132a) is performed by means of a quantization software module or processor $MQ^{-1}$_DO2 represented in FIG. 3B, which is driven by the microprocessor μP of the processing unit UT_DO2.

In the course of step D113a), there is undertaken, in the course of a sub-step D1133a) represented in FIG. 4B, a transformation of the current set of dequantized coefficients $BSDt_u$, such a transformation being an inverse direct transformation. This transformation is the operation inverse to the transformation performed in sub-step C1141a) of FIG. 1B. On completion of sub-step D1133a), a current decoded residual block BSDr$_u$ is obtained.

Sub-step D1133a) is implemented by an inverse transformation software module or processor MT$^{-1}$_DO2 such as represented in FIG. 3B, which is driven by the microprocessor μP of the processing unit UT_DO2.

The processor MT$^{-1}$_DO2 is able to implement an inverse direct transformation such as for example an inverse discrete cosine transformation of DCT$^{-1}$ type, an inverse discrete sine transformation of DST$^{-1}$ type, an inverse discrete wavelet transformation of DWT$^{-1}$ type.

In the course of a step D114a) represented in FIG. 4B, there is undertaken, in accordance with the invention, the reconstruction of the current block B$_u$ by adding to the decoded residual block BSDr$_u$, obtained on completion of sub-step D1133a):

the optimal predictor block BP$_{opt}$ which was obtained on completion of the aforementioned step D4 of FIG. 4A, and the optimal quantization vector V$_{opt}$ which was obtained on completion of aforementioned step D111a) of FIG. 4B.

On completion of step D114a), a current decoded block BD$_u$ is obtained.

Step D114a) is implemented by a calculation software module or processor CAL2_DO2 represented in FIG. 3B, which is driven by the microprocessor μP of the processing unit UT_DO2.

In the course of a step D115a) represented in FIG. 4B, said decoded block BD$_u$ is written in a decoded image ID$_j$.

Such a step is implemented by an image reconstruction software module or processor URI2 such as represented in FIG. 3B, said module being driven by the microprocessor μP of the processing module UT_DO2.

In the course of a step D116a) represented in FIG. 4B, there is undertaken a test which consists in verifying whether a criterion for updating the dictionaries CBK$_1$, CBK$_2$, ..., CBK$_W$ is fulfilled or not.

According to a first variant, such a criterion consists in comparing the number of non-zero coefficients in the decoded residual block BSDr$_u$ with a predetermined threshold. For example, the updating criterion is considered to be fulfilled if the number of non-zero coefficients is greater than 3.

According to a second variant, such a criterion consists in comparing the bitrate of the coding of the decoded residual block BSDr$_u$ with a predetermined threshold. For example, the updating criterion is considered to be fulfilled if the bitrate of the coding of the decoded residual block BSDr$_u$ is greater than 10 bits.

Step D116a) is implemented by a calculation software module or processor CAL7_DO2 such as represented in FIG. 3B, which is driven by the microprocessor μP of the processing unit UT_DO2.

If the updating criterion is fulfilled, in the course of a step D117a) represented in FIG. 4B, there is undertaken an updating of at least one of the dictionaries CBK$_1$, CBK$_2$, ..., CBK$_W$.

Step D117a) is implemented by a calculation software module or processor CAL8_DO2 such as represented in FIG. 3B, which is driven by the microprocessor μP of the processing unit UT_DO2.

Step D117a) being identical to step C117a) of updating the dictionaries such as implemented on coding with reference to FIG. 1B, this step will not be described at greater length.

Subsequent to aforementioned step D117a), there is undertaken, in the course of a step D118a) represented in FIG. 4B, the selection of the following quantized residual block of the current image IC$_j$ to be decoded. Next the steps described hereinabove of decoding the following quantized residual block are again implemented.

If on completion of aforementioned step D116a), the updating criterion is not fulfilled, there is undertaken, in the course of aforementioned step D118a), the selection of the following quantized residual block of the current image IC$_j$ to be decoded. Next, the steps described hereinabove with reference to FIG. 4B of decoding the following quantized residual block are again implemented.

In the course of a step D119a) represented in FIG. 4B, the decoder DO2 of FIG. 3B tests whether the current block which was decoded in accordance with the decoding method described hereinabove is the last block of the current image IC$_j$ to be decoded.

If such is not the case, aforementioned step D118a) is implemented.

If the current block is the last block of the current image IC$_j$ to be decoded, in the course of a step D120a) represented in FIG. 4B, the decoder DO2 of FIG. 3B tests whether or not the following current image IC$_{j+1}$ to be decoded is an image of Intra type.

In the case where the following current image IC$_{j+1}$ to be decoded is of Intra type, before undertaking the decoding of the blocks of this image in accordance with the decoding method of FIG. 4A and optionally the decoding by inverse vector quantization of FIGS. 4B and 4C, step D117a) of updating the dictionaries is implemented.

In the example represented, the quantization vectors of the dictionary CBK$_{opt}$ are each initialized to a predetermined respective value.

In the case where the following current image IC$_{j+1}$ to be decoded is not of Intra type, the decoding of the blocks of this image is directly undertaken in accordance with the decoding method of FIG. 4A and the decoding by inverse vector quantization of FIGS. 4B and 4C is optionally undertaken.

The decoding steps which have just been described hereinabove are implemented for all the blocks B$_1$, B$_2$, ..., B$_u$, ..., B$_S$ to be decoded of the current image IC$_j$ considered, in a predetermined order which is for example the lexicographic order.

FIG. 4C describes more precisely how the vector inverse quantization is implemented when it has been verified, on completion of step D5 of FIG. 4A, that the first type of inverse prediction is Inter.

With reference to FIG. 4C, in the course of a step D110b), there is undertaken a decoding of the index IV$_{opt}$ of the optimal quantization vector V$_{opt}$ which was selected on completion of step C612b) of FIG. 1C.

Such a decoding step D110b) is implemented by the decoding module DB_DO2 of FIG. 3B.

In the course of a step D111b) represented in FIG. 4C, there is undertaken the determination of the optimal quantization vector V$_{opt}$ associated with the decoded index IV$_{opt}$.

Step D111b) is implemented by the calculation software module or processor CAL4_DO2 of FIG. 3B.

In the course of a step D112b) represented in FIG. 4C, there is undertaken the selection of an optimal mode of prediction MP'$_{opt}$ which represents the inverse prediction mode of a second type selected according to the invention. As already described previously as regards the second embodiment of the coding of FIG. 1C, step D112b) consists in selecting from among the available candidate predictor blocks, the candidate predictor which minimizes the distortion between the optimal predictor block $BP_{opt}$ which was obtained on completion of the aforementioned inverse prediction step D4 of a first type and each of said available candidate predictor blocks. In the same manner as in the case of the prediction of the aforementioned first type, each of the candidate predictor blocks set into competition in the course of step D112b) is a block of pixels which has been already decoded. Such predictor blocks are stored beforehand in the buffer memory TAMP_DO2 of the decoder DO2 of FIG. 3B.

On completion of step D112b), an optimal predictor block $BP'_{opt}$ is obtained. Such an optimal predictor block $BP'_{opt}$ is then associated with its optimal mode of prediction $MP'_{opt}$ which represents the inverse prediction mode of a second type selected according to the invention.

Step D112b) is implemented by a calculation software module or processor CAL3_DO2 such as represented in FIG. 3B, which is driven by the microprocessor μP of the processing unit UT_DO2.

In the course of a step D113b) represented in FIG. 4C, there is undertaken the selection of a dictionary of quantization vectors $CBK_{opt}$ which belongs to one or more dictionaries of quantization vectors available to the decoder, denoted $CBK_1$, $CBK_2$, ..., $CBK_W$. Such dictionaries are stored beforehand in the buffer memory TAMP_DO2 of the decoder DO2, such as represented in FIG. 3B.

In accordance with the second embodiment of the invention, the dictionary $CBK_{opt}$ selected is that which is associated with the optimal mode of prediction $MP'_{opt}$ which was selected in step D112b).

Step D113b) is implemented by the calculation software module or processor CAL5_DO2 of FIG. 3B.

In the course of a step D114b) represented in FIG. 4C, there is undertaken, in accordance with the second embodiment of the invention, a decoding of the data of the quantized residual block $BSq_u$.

In the course of step D114b), there is undertaken, in the course of a sub-step D1141b) represented in FIG. 4C, a decoding of the current set of quantized coefficients $BSq_u$.

Such a decoding is for example an entropy decoding of CABAC type or else an entropy decoding of arithmetic or Huffman type.

On completion of aforementioned sub-step D1141b), a set $BSDq_u$ of digital information associated with the current set of quantized coefficients $BSq_u$ is obtained.

Such a decoding sub-step D1141b) is implemented by the entropy decoding module MD_DO2 of FIG. 3B.

In the course of step D114b), there is undertaken, in the course of a sub-step D1142b) represented in FIG. 4C, a dequantization of the digital information obtained subsequent to sub-step D1141b), according to a conventional dequantization operation which is the operation inverse to the quantization implemented during the quantization sub-step C1152b) of FIG. 1C. A current set of dequantized coefficients $BSDt_u$ is then obtained on completion of sub-step D1142b). Such a dequantization sub-step is for example of scalar or vector type.

Sub-step D1142b) is performed by means of the quantization software module or processor $MQ^{-1}$_DO2 of FIG. 3B.

In the course of step D114b), there is undertaken, in the course of a sub-step D1143b) represented in FIG. 4C, a transformation of the current set of dequantized coefficients $BSDt_u$, such a transformation being an inverse direct transformation. This transformation is the operation inverse to the transformation performed in sub-step C1151b) of FIG. 1C.

On completion of sub-step D1143b), a current decoded residual block $BSDr_u$ is obtained.

Sub-step D1143b) is implemented by the inverse transformation software module or processor $MT^{-1}$_DO2 of FIG. 3B.

In the course of a step D115b) represented in FIG. 4C, there is undertaken, in accordance with the invention, the reconstruction of the current block $B_u$ by adding to the decoded residual block $BSDr_u$, obtained on completion of sub-step D1143b):

the optimal predictor block $BP_{opt}$ which was obtained on completion of the aforementioned step D4 of FIG. 4A, and the optimal quantization vector $V_{opt}$ which was obtained on completion of aforementioned step D111b) of FIG. 4C.

On completion of step D115b), a current decoded block $BD_u$ is obtained.

Step D115b) is implemented by the calculation software module or processor CAL2_DO2 of FIG. 3B.

In the course of a step D116b) represented in FIG. 4C, said decoded block $BD_u$ is written in a decoded image $ID_j$.

Such a step is implemented by the image reconstruction software module or processor URI2 of FIG. 3B.

In the course of a step D117b) represented in FIG. 4C, there is undertaken a test which consists in verifying whether a criterion for updating the dictionaries $CBK_1$, $CBK_2$, ..., $CBK_W$ is fulfilled or not.

Step D117b) being identical to step D116a) of updating the dictionaries of FIG. 4B, this step will not be described at greater length.

Step D117b) is implemented by the calculation software module or processor CAL7_DO2 of FIG. 3B.

If the updating criterion is fulfilled, in the course of a step D118b) represented in FIG. 4C, there is undertaken an updating of at least one of the dictionaries $CBK_1$, $CBK_2$, ..., $CBK_W$.

Step D118b) is implemented by the calculation software module or processor CAL8_DO2 of FIG. 3B.

Step D118b) being identical to step D117a) of updating the dictionaries of FIG. 4B, this step will not be described at greater length.

Subsequent to aforementioned step D118b), there is undertaken, in the course of a step D119b) represented in FIG. 4C, the selection of the following quantized residual block of the current image $IC_j$ to be decoded. Next the steps described hereinabove of decoding the following quantized residual block are again implemented.

If on completion of aforementioned step D117b), the updating criterion is not fulfilled, there is undertaken, in the course of aforementioned step D119b), the selection of the following quantized residual block of the current image $IC_j$ to be decoded. Next, the steps described hereinabove with reference to FIG. 4C of decoding the following quantized residual block are again implemented.

In the course of a step D120b) represented in FIG. 4C, the decoder DO2 of FIG. 3B tests whether the current block which was decoded in accordance with the decoding method described hereinabove is the last block of the current image $IC_j$ to be decoded.

If such is not the case, aforementioned step D119b) is implemented.

If the current block is the last block of the current image $IC_j$ to be decoded, in the course of a step D121b) represented in FIG. 4C, the decoder DO2 of FIG. 3B tests whether or not the following current image $IC_{j+1}$ to be decoded is an image of Intra type.

In the case where the following current image $IC_{j+1}$ to be decoded is of Intra type, before undertaking the decoding of the blocks of this image in accordance with the decoding method of FIG. 4A and optionally the decoding by inverse vector quantization of FIGS. 4B and 4C, step D118b) of updating the dictionaries is implemented.

In the example represented, the quantization vectors of the dictionary $CBK_{opt}$ are each initialized to a predetermined respective value.

In the case where the following current image $IC_{j+1}$ to be decoded is not of Intra type, the decoding of the blocks of this image is directly undertaken in accordance with the decoding method of FIG. 4A and the decoding by inverse vector quantization of FIGS. 4B and 4C is optionally undertaken.

The decoding steps which have just been described hereinabove are implemented for all the blocks $B_1, B_2, \ldots, B_u, \ldots, B_S$ to be decoded of the current image $IC_j$ considered, in a predetermined order which is for example the lexicographic order.

It goes without saying that the embodiments which have been described hereinabove have been given purely by way of wholly non-limiting indication, and that numerous modifications can be easily made by the person skilled in the art without however departing from the scope of the invention.

The invention claimed is:

1. A coding method for coding at least one image split into blocks, which comprises the following acts performed by a coding device for a current block to be coded:
   determining a first type of prediction of the current block, Inter or Intra,
   determining a mode of prediction associated with the first type of prediction,
   obtaining a predictor block on the basis of the mode of prediction determined,
   calculating a residual block, which is representative of the difference between the predictor block obtained and the current block, as a result of application of said mode of prediction determined,
   selecting a mode of prediction from among a plurality of modes of prediction according to a second type, said second type being Intra if said first type determined is Inter or Inter if said first type determined is Intra, in which the selecting of the mode of prediction according to the second type is implemented as a function of said predictor block obtained on the basis of said mode of prediction determined, associated with the first type of prediction, and
   coding the residual block calculated with the aid of a coding parameter dependent on the prediction mode selected.

2. The coding method as claimed in claim 1, in which the selected mode of prediction is that on the basis of which a predictor block is obtained which, from among other candidate predictor blocks, minimizes the distortion between the predictor block obtained on the basis of the mode of prediction associated with the first type of prediction and each of the candidate predictor blocks.

3. The coding method as claimed in claim 1, in which the coding parameter belongs to the group consisting of:
   a transform operation,
   a dictionary of quantization vectors,
   an entropy coder,
   a scalar quantization operation.

4. A coding device for coding at least one image split into blocks, comprising,
   a processor; and
   a non-transitory computer-readable medium comprising instructions stored thereon, which when executed by the processor configure the coding device to perform acts comprising: for a current block ($B_u$) to be coded: determining:
      a first type of prediction of the current block, Inter or Intra,
      a mode of prediction associated with the first type of prediction,
   delivering a predictor block on the basis of the mode of prediction determined,
   calculating a residual block, which is representative of the difference between the predictor block delivered and the current block, as a result of application of said mode of prediction determined
   selecting a mode of prediction from among a plurality of modes of prediction according to a second type, said second type being Intra if said first type determined is Inter or Inter if said first type determined is Intra, in which the selecting of the mode of prediction according to the second type is implemented as a function of said predictor block obtained on the basis of said mode of prediction determined, associated with the first type of prediction,
   coding the residual block calculated with the aid of a coding parameter dependent on the prediction mode selected.

5. A non-transitory computer-readable recording medium on which is recorded a computer program comprising program code instructions for execution of a coding method for coding at least one image split into blocks, when said program is executed by a computer, wherein the coding method comprises:
   determining a first type of prediction of the current block, Inter or Intra,
   determining a mode of prediction associated with the first type of prediction,
   obtaining a predictor block on the basis of the mode of prediction determined,
   calculating a residual block, which is representative of the difference between the predictor block obtained and the current block, as a result of application of said mode of prediction determined,
   selecting a mode of prediction from among a plurality of modes of prediction according to a second type, said second type being Intra if said first type determined is Inter or Inter if said first type determined is Intra, in which the selecting of the mode of prediction according to the second type is implemented as a function of said predictor block obtained on the basis of said mode of prediction determined, associated with the first type of prediction, and
   coding the residual block calculated with the aid of a coding parameter dependent on the prediction mode selected.

6. A decoding method for decoding a data signal representative of at least one image split into blocks, which comprises the following acts performed by a decoding device for a current block to be decoded:
   determining, in said data signal, of a residual block relating to the current block to be decoded,
   determining a first type of prediction of the current block, Inter or Intra,
   determining a mode of prediction associated with said first type of prediction,
   obtaining a predictor block on the basis of said mode of prediction determined, selecting a mode of prediction from among a plurality of modes of prediction of a second type, said second type being Intra if said first type determined is Inter or Inter if said first type determined is Intra, in which the selecting of the mode of prediction according to the second type is implemented as a function of said predictor block obtained on the basis of said mode of prediction determined, associated with the first type of prediction, reconstructing the current block on the basis of the residual block determined, of the predictor block obtained and of a decoding parameter dependent on the prediction mode selected.

7. The decoding method as claimed in claim 6, in which the selected mode of prediction is that on the basis of which a predictor block is obtained which, from among other candidate predictor blocks, minimizes the distortion between the predictor block obtained on the basis of the mode of prediction associated with the first type of prediction and each of the candidate predictor blocks.

8. The decoding method as claimed in claim 6, in which the decoding parameter belongs to the group consisting of:
   a transform operation,
   a dictionary of quantization vectors,
   an entropy decoder,
   a scalar quantization operation.

9. A device for decoding a data signal representative of at least one image split into blocks, comprising:
   a processor; and
   a non-transitory computer-readable medium comprising instructions stored thereon, which when executed by the processor configure the decoding device to perform acts comprising: for a current block to be decoded:
   determining, in said data signal, a residual block relating to the current block to be decoded,
   determining:
      a first type of prediction of the current block, Inter or Intra,
      a mode of prediction associated with the first type of prediction,
   delivering a predictor block on the basis of the mode of prediction determined,
   selecting a mode of prediction from among a plurality of modes of prediction of a second type, said second type being Intra if said first type determined is Inter or Inter if said first type determined is Intra, in which the selecting of the mode of prediction according to the second type is implemented as a function of said predictor block obtained on the basis of said mode of prediction determined, associated with the first type of prediction, and reconstructing the current block on the basis of the residual block determined, of the predictor block delivered and of a decoding parameter determined on the basis of the prediction mode selected.

10. A non-transitory computer-readable recording medium on which is recorded a computer program comprising program code instructions for execution of a decoding method for decoding a data signal representative of at least one image split into blocks, when said program is executed by a computer, wherein the method comprises:
   determining, in said data signal, of a residual block relating to the current block to be decoded,
   determining a first type of prediction of the current block, Inter or Intra,
   determining a mode of prediction associated with said first type of prediction,
   obtaining a predictor block on the basis of said mode of prediction determined,
   selecting a mode of prediction from among a plurality of modes of prediction of a second type, said second type being Intra if said first type determined is Inter or Inter if said first type determined is Intra, in which the selecting of the mode of prediction according to the second type is implemented as a function of said predictor block obtained on the basis of said mode of prediction determined, associated with the first type of prediction,
   reconstructing the current block on the basis of the residual block determined, of the predictor block obtained and of a decoding parameter dependent on the prediction mode selected.

11. The coding method of claim 1, further comprising:
   forming a data signal comprising the coded residual block; and
   transmitting the data signal on a communication network.

12. The decoding method of claim 6, further comprising:
   receiving the data signal from a communication network.

* * * * *